United States Patent
Graebe et al.

(10) Patent No.: US 6,687,936 B2
(45) Date of Patent: Feb. 10, 2004

(54) VALVE FOR ZONED CELLULAR CUSHION

(75) Inventors: Robert W. Graebe, Belleville, IL (US); Robert Klotz, Freeburg, IL (US); Paul A. Rickman, Belleville, IL (US); Dennis L. Clapper, Swansea, IL (US)

(73) Assignee: Roho, Inc., Belleville, IL (US)

(*) Notice: Subject to any disclaimer, the term of this patent is extended or adjusted under 35 U.S.C. 154(b) by 0 days.

(21) Appl. No.: 10/255,277

(22) Filed: Sep. 26, 2002

(65) Prior Publication Data

US 2003/0192125 A1 Oct. 16, 2003

Related U.S. Application Data

(63) Continuation-in-part of application No. 10/052,101, filed on Jan. 17, 2002.
(60) Provisional application No. 60/262,585, filed on Jan. 18, 2001.

(51) Int. Cl.[7] .................. A47C 27/10; F16K 11/06
(52) U.S. Cl. .................. 5/710; 5/713; 5/655.3; 5/654; 137/625.48; 251/325
(58) Field of Search .................. 5/710, 713, 706, 5/655.3, 654, 644; 137/625.48; 251/319, 325

(56) References Cited

U.S. PATENT DOCUMENTS

| | | |
|---|---|---|
| 805,237 A | 11/1905 | Sears |
| 1,397,220 A | 11/1921 | Lord |
| 1,468,072 A | 9/1923 | Ogle |
| 1,746,953 A | 2/1930 | McCollum |
| 1,775,856 A | 9/1930 | Hauser |
| 1,821,719 A | 9/1931 | Messier |
| 1,935,119 A | 11/1933 | Guild |
| 1,970,803 A | 8/1934 | Johnson |
| 2,078,402 A | 4/1937 | McDonough et al. |

(List continued on next page.)

FOREIGN PATENT DOCUMENTS

| | | |
|---|---|---|
| DE | 1951476 | 10/1969 |
| WO | 9913814 | 3/1999 |
| WO | 2065004 | 8/2002 |

OTHER PUBLICATIONS

U.S. Patent Appln. 10/052,101; Filed Jan. 17, 2002; Graebe, et al.; Valve for Zoned Cellular Cushion; pp. 1–15; Publication No. 2002/0066143 A1, Pub. Date Jun. 6, 2002.

CONFORM ROHO Incorporated; The ROHO Quadtro Cushion.

CONFORM Airfloatation Systems.

CONFORM Airfloatation Cushions.

(List continued on next page.)

*Primary Examiner*—Robert G. Santos
(74) *Attorney, Agent, or Firm*—Polster, Lieder, Woodruff & Lucchesi, L.C.

(57) ABSTRACT

A valve for use with an inflatable cushion having individual inflation zones including a slide housing positioned between two outer casing halves. Each casing half has a plurality of nipple connector seats. Each nipple connector seat has at least one external detent. The slide housing has a series of nipple connectors along its length that are inserted into air conduits in the peripheral edge of the cushion, which, in turn, are connected to the individual inflation zones. Each nipple connector has at least one retainer groove in the surface. The casing half detents engage the cushion edge and the retainer grooves to retain the nipple in the air conduits. There is a movable slide inside the slide seat bore. The slide has a longitudinal inner bore and a number of openings along its length that communicate with the inner bore. The valve is opened by aligning the slide openings with the connector nipples to allow the inflation zones to communicate through the valve slide bore and is closed by moving the slide openings out of alignment with the casing openings to seal off the inflation zones.

18 Claims, 14 Drawing Sheets

U.S. PATENT DOCUMENTS

| | | |
|---|---|---|
| 2,136,510 A | 11/1938 | Jensen |
| 2,182,982 A | 12/1939 | Evans |
| 2,260,437 A | 10/1941 | Chambers |
| 2,434,641 A | 1/1948 | Burns |
| 2,575,764 A | 11/1951 | Morner |
| 2,645,450 A | 7/1953 | Chessman |
| 2,731,652 A | 1/1956 | Bishop |
| 2,838,099 A | 6/1958 | Warner |
| 2,858,851 A | 11/1958 | Holl |
| 2,906,492 A | 9/1959 | Conrad |
| 3,000,399 A | 9/1961 | Brukner |
| 3,044,491 A | 7/1962 | Sangster |
| 3,112,956 A | 12/1963 | Schick et al. |
| 3,192,540 A | 7/1965 | Swank |
| 3,192,541 A | 7/1965 | Moore |
| 3,200,846 A | 8/1965 | Beck |
| 3,215,163 A | 11/1965 | Henderson |
| 3,303,518 A | 2/1967 | Ingram |
| 3,308,851 A | 3/1967 | Zoludow |
| 3,385,113 A | 5/1968 | Harris |
| 3,462,778 A | 8/1969 | Whitney |
| 3,527,256 A | 9/1970 | Colombo |
| 3,605,145 A | 9/1971 | Graebe |
| 3,678,959 A | 7/1972 | Liposky |
| 3,707,168 A | 12/1972 | Boelkins |
| 3,740,777 A | 6/1973 | Dee |
| 3,763,891 A | 10/1973 | Stiltner |
| 3,806,084 A | 4/1974 | Seese |
| 3,828,821 A | 8/1974 | Dotter |
| 3,870,450 A | 3/1975 | Graebe |
| 3,893,481 A | 7/1975 | Watts |
| 3,982,786 A | 9/1976 | Burgin et al. |
| 3,984,886 A | 10/1976 | Keeton |
| 4,005,236 A | 1/1977 | Graebe |
| 4,161,794 A | 7/1979 | Darnfors |
| 4,182,374 A | 1/1980 | Spanides |
| 4,186,734 A | 2/1980 | Stratton |
| 4,219,532 A | 8/1980 | Messervey et al. |
| 4,231,399 A | 11/1980 | Pauliukonis |
| 4,267,611 A | 5/1981 | Agulnick |
| 4,279,044 A | 7/1981 | Douglas |
| 4,370,769 A | 2/1983 | Herzig et al. |
| 4,422,194 A | 12/1983 | Viesturs et al. |
| 4,541,136 A | 9/1985 | Graebe |
| 4,592,589 A | 6/1986 | Hellwig |
| 4,662,012 A | 5/1987 | Torbet |
| 4,690,171 A | 9/1987 | Johnston |
| 4,698,864 A | 10/1987 | Graebe |
| 4,852,195 A | 8/1989 | Schulman |
| 4,864,671 A | 9/1989 | Evans |
| 4,893,367 A | 1/1990 | Heimreid et al. |
| 5,052,068 A | 10/1991 | Graebe |
| 5,090,076 A | 2/1992 | Guldager |
| 5,111,544 A | 5/1992 | Graebe |
| 5,163,196 A | 11/1992 | Graebe et al. |
| 5,373,595 A | 12/1994 | Johnson et al. |
| 5,444,881 A | 8/1995 | Landi et al. |
| 5,502,855 A | 4/1996 | Graebe |
| 5,564,143 A | 10/1996 | Pekar et al. |
| 5,678,265 A | 10/1997 | Meyer |
| 5,689,845 A | 11/1997 | Sobieralski |
| 5,765,594 A | 6/1998 | Collins et al. |
| 5,772,182 A | 6/1998 | Stambaugh, Sr. et al. |
| 5,839,140 A | 11/1998 | Wilkerson |
| 5,920,934 A | 7/1999 | Hannagan et al. |
| 6,058,538 A | 5/2000 | Chapman et al. |
| 6,122,785 A | 9/2000 | Bondie et al. |
| 6,321,401 B1 | 11/2001 | Fleming et al. |
| 6,564,410 B2 * | 5/2003 | Graebe et al. .................. 5/710 |
| 2003/0084945 A1 * | 5/2003 | Chiu ..................... 137/625.48 |

OTHER PUBLICATIONS

CONFORM Materials and specifications; Cleaning and maintenance; Warranty.

The High Profile CONFORM C—4 Cushion.

CONFORM C4 Vierkammer–Luftsitzkissen.

CONFORM Medical Air–Floatation–Systems; Coussins pneumatiques medicaux; Medizinische Luftkissensysteme; Sistemas de ancolchados medico–neumaticos.

CONFORM Air Floatation Systems Features CONFORM Air Floatation Mattresses; CONFORM Air Floatation Seating cushions.

CONFORM CONFORM mattresses; C–4 cushion; CONFORM seating cushions.

CONFORM Mattress Systems.

Appln. 10/052,101; Filed Jan. 17, 2002; Graebe, et al.; Valve for Zoned Cellular Cushion, pp. 1–15.

* cited by examiner

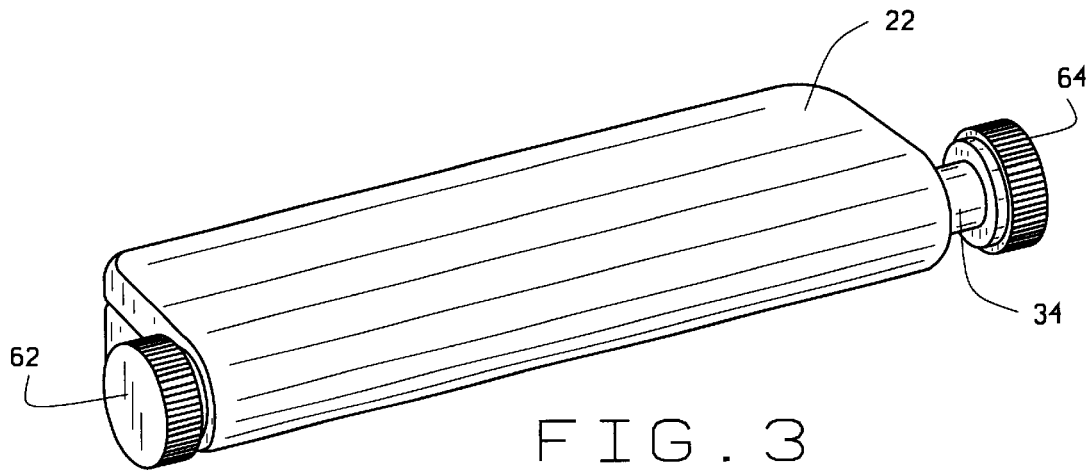
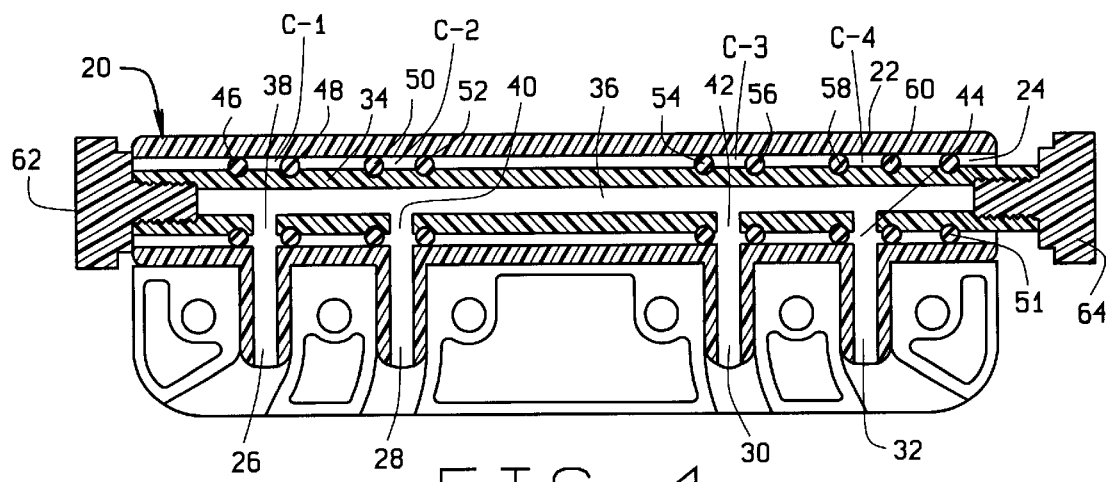
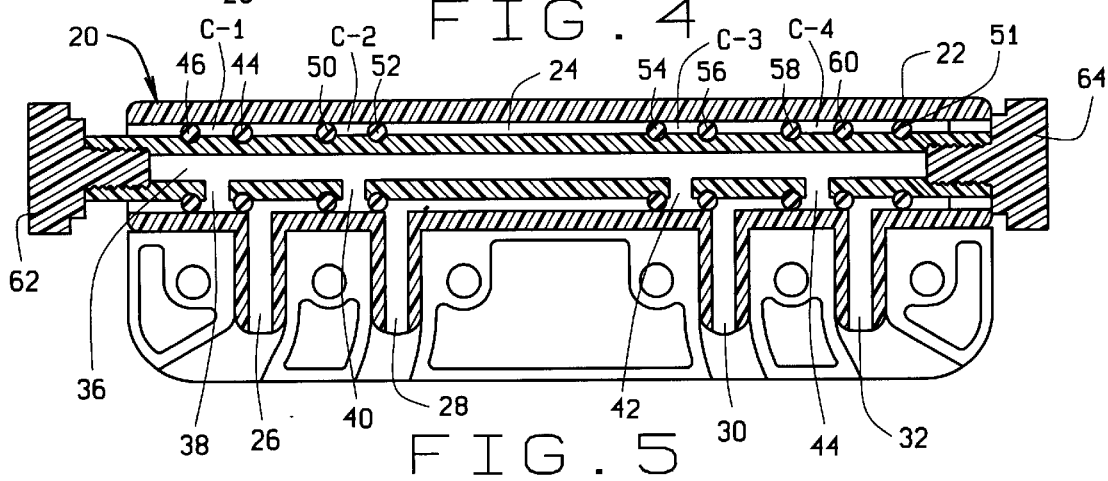

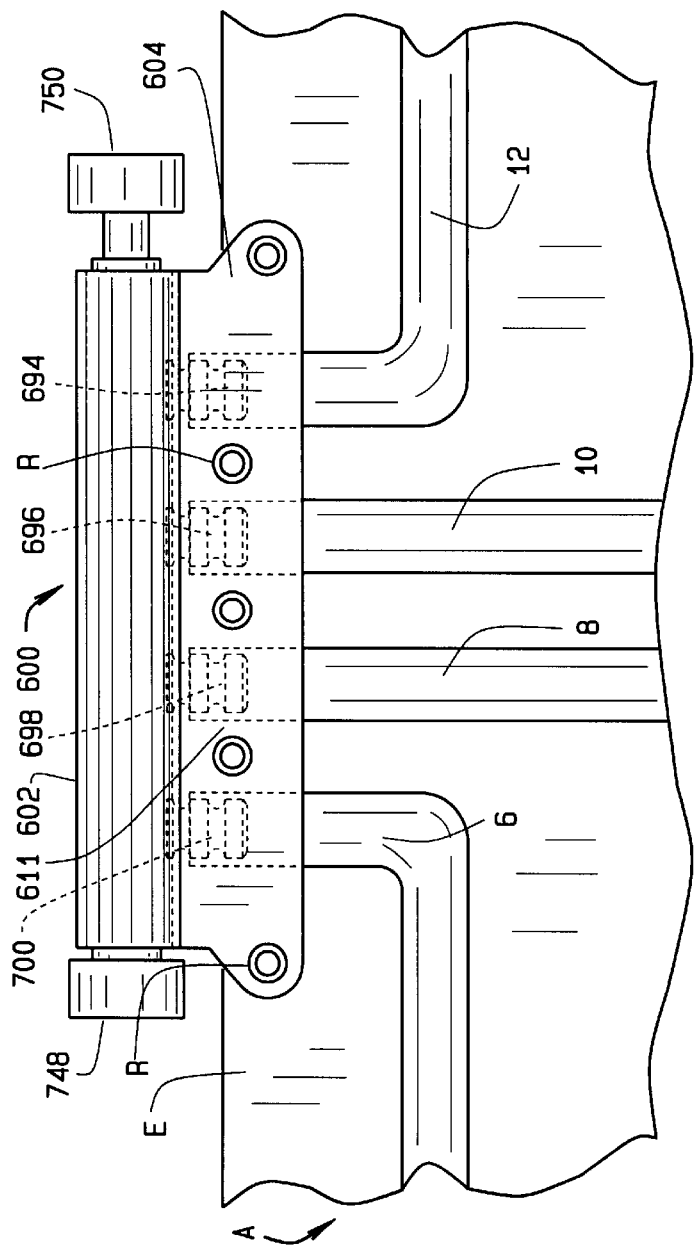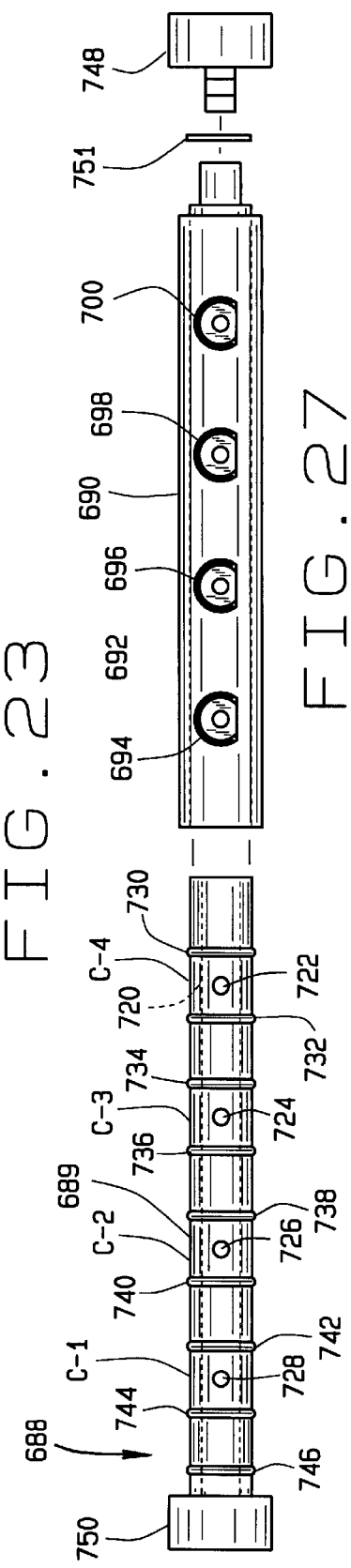

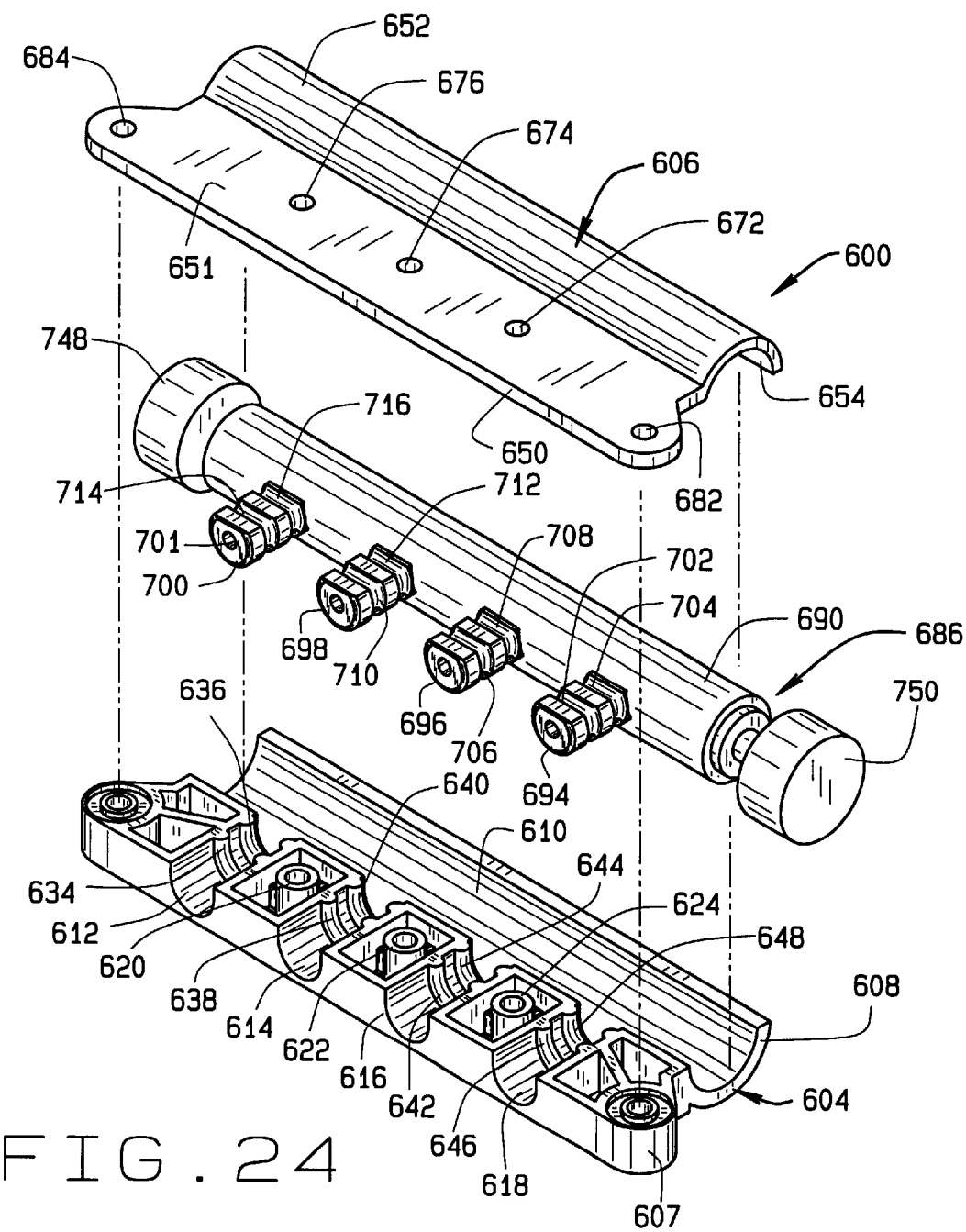
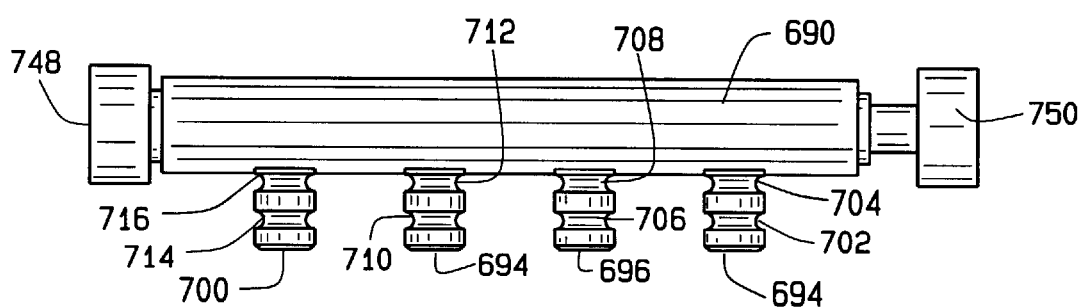
FIG. 24
FIG. 25

VALVE FOR ZONED CELLULAR CUSHION

CROSS-REFERENCE TO RELATED APPLICATIONS

This application is a continuation-in-part of application Ser. No. 10/052,101, filed Jan. 17, 2002, which claims priority to provisional application Serial No. 60/262,585, filed Jan. 18, 2001.

BACKGROUND OF THE INVENTION

This invention relates in general to inflatable mattresses and cushions and, more particularly, to an improved valve for use with an inflatable mattress or cushion having normally isolated zones to place the normally isolated zones in communication with each other or with the atmosphere in any desired arrangement of communication. The valve has improved attachment and sealing features.

Those individuals who are confined to wheelchairs run the risk of tissue breakdown and the development of pressure sores, which are extremely dangerous and difficult to treat and cure. Typically, much of the individual's weight concentrates in the region of the ischia, that is, at the bony prominence of the buttocks, and unless frequent movement occurs, the flow of blood to the skin tissue in these regions decreases to the point that the tissue breaks down. Cushions that are especially designed for wheelchairs exist for reducing the concentration of weight in the region of the ischia, and these cushions generally seek to distribute the user's weight more uniformly over a larger area of the buttocks.

Cellular cushions provide the most uniform distribution of weight and thus provide the greatest protection from the occurrence of pressure sores. These cushions have an array of closely spaced air cells that project upwardly from a common base. Within the base the air cells communicate with each other, and thus, all exist at the same internal pressure. Hence, each air cell exerts essentially the same restoring force against the buttocks, irrespective of the extent to which it is deflected. U.S. Pat. No. 4,541,136 shows a cellular cushion currently manufactured and sold by ROHO, Inc. of Belleville, Ill., for use on wheelchairs.

In a sense the typical cellular cushion provides a highly displaceable surface that tends to float the user. While this reduces the incidence of pressure sores, it detracts from the stability one usually associates with a seating surface. Most of those confined to wheelchairs have little trouble adjusting to the decrease in stability, but for those who have skeletal deformities, particularly in the region of the pelvis and thighs, and for those who lack adequate strength in their muscles, lesser stability can be a source of anxiety. A variation of the cellular cushion addresses this problem with totally isolated zones and also with cells of varying height. By varying the volume of air between zones, for example, one can accommodate for skeletal deformities while still maintaining satisfactory protection against pressure sores. U.S. Pat. No. 4,698,864, owned by the assignee of the instant invention, shows zoned cellular cushion with cells of varying height.

Typically, a zoned cellular cushion has a separate filling stem and valve for each of its zones. The user simply opens the valve of each stem and introduces air into the zone for the stem, usually with a hand pump, and then releases the air from the zones until the desired posture is achieved. In a more sophisticated arrangement, a hose kit connects a single pump to a manifold, which in turn is connected to the several valves through separate hoses. Those hoses are fitted with separate hose clamps so that the air from the pump may be directed to the cells of the individual zones independently. Likewise, the air can be released from them independently, all by manipulating the clamps.

The hoses of the hose kit lie externally of the cushion and may become entangled in the components of a wheelchair. Furthermore, by reason of their remote locations, the hose clamps are difficult to manipulate. Examples of zoned inflatable cushions that demonstrate significant advantages from zoning are provided in U.S. Pat. No. 5,163,196 and U.S. Pat. No. 5,502,855. The '196 patent describes a valve for a zoned inflatable cushion such that access to all of the zones is cut off simultaneously because the valve is in a flap which is part of the cushion base and all of the access channels run through the flap. U.S. Pat. No. 5,502,855 utilizes a series of hoses to inflate the cushion and gathers the ends of the hoses in close proximity adjacent one edge of the cushion to prevent tangling. The cushion of the '855 patent also provides access to the cushion zones from beneath the cushion and provides access to each cell so as to be able to monitor from remote locations.

The present invention is an improvement on valves required by zoned cellular cushions. Heretofore, the zoned cushions employed integral channels which lead from the several zones and which are connected through an integral common manifold and associated valve. One such valve comprises a flap that is folded over to seal off the ends of the channels or opened to allow communication between the zones through a manifold contained within the flap. Through use it has been determined that these flap-type valves and other prior art zoned cushion valves suffer from some drawbacks. First, in the flap-type valve, the flap has to be manually folded closed and secured with a snap or the like. Often these types of apparatus are difficult for a disabled individual to manipulate. The flap can be awkwardly positioned under the cushion.

A more urgent concern is that the flap valve possibly could leak or fail if the ends of the channels are not appropriately sealed. Continued use and normal wear over time may impair the effectiveness of the flap-type valve. Leaking through the valve could result in unwanted communication between the zones or, in the worst case, could result in loss of air from the cushion and a phenomenon known as "bottoming out" where the user's buttocks come to rest on an non-cushioned surface. If the user has no sensation or feeling in the buttocks, for example, the user could "bottom out" and not be aware.

Newer valves designed to prevent leakage are the subject matter of the inventors' co-pending U.S. patent application Ser. No. 10/052,101, filed Jan. 17, 2002 and co-pending International Application WO 02/065004, filed Jan. 17, 2002, owned by a common assignee. Although the valves described therein work well for their intended purposes and represent an improvement over the flap-valve design, the inventors have developed a novel valve design that incorporates improved attachment and sealing features.

SUMMARY OF THE INVENTION

The present invention, when employed for example with a zoned cushion having a plurality of inflation zones, provides an easily manipulated valve assembly which can be used to allow fluid communication between two or more zones or can be used to isolate the zones. The valve also provides structure for attaching the valve to the cushion to help prevent dislocation and leakage.

In one aspect of the invention, the valve, in general, includes a casing having an internal bore and a plurality of openings along the length of the casing that open into the bore. The openings are connected to the individual inflation zones via tubing or the like to place the bore of the casing in communication with the inflation zones. The valve also includes a movable slide seated snugly within the casing bore. The slide has a longitudinal internal bore and a number of openings along its length that communicate with the slide bore. Generally the number of openings in the slide is the same as the number of openings in the valve casing. The openings are isolated by seals positioned on each side of the opening to form discrete air chambers at each opening. The slide can be manipulated to align the discrete air chambers with the casing openings so as to functionally align the slide openings with the casing openings to allow the inflation zones to communicate and the air to flow to and from the various inflation zones through the valve slide bore. Correspondingly, the slide can be manipulated to move the slide openings and the casing openings out of alignment, thereby sealing off the inflation zones.

An exemplary embodiment of the improved slide valve of the present invention includes a slide housing positioned between two outer casing halves. One casing half has a plurality of nipple connector seats. Each nipple connector seat has a pair of external detent. The opposed casing half has complementary detents. The slide housing has a longitudinal inner bore and a plurality of nipple connectors along its length that are inserted into air conduits in the peripheral edge of the cushion, which, in turn, are connected to the individual inflation zones. There is a movable slide inside the slide-housing bore. The slide has a longitudinal inner bore and a number of openings along its length that communicate the inner bore. The valve is opened by functionally aligning the slide openings with the connector nipples to allow the inflation zones to communicate through the valve slide bore and is closed by moving the slide openings out of alignment with the casing openings to seal off the inflation zones. Each nipple connector has at least a pair of retainer grooves in the surface. The detents one each casing half engage the cushion edge and the nipple connector retainer grooves to retain the nipple in the air conduits by spreading adhesive that was introduced into the grooves prior to inserting the connector nipple into the air conduit and also by physically impinging the cushion material and connector nipples between the two halves of the casing.

BRIEF DESCRIPTION OF THE SEVERAL VIEWS OF THE DRAWINGS

The various aspects of the invention are achieved as set forth in the illustrative embodiments shown in the drawings, which form a part of the specification.

FIG. 3 is an enlarged perspective view of one embodiment of a novel cushion valve of the present invention;

FIG. 4 is a cross-section of the novel cushion valve of FIG. 3, the valve being in an open position;

FIG. 5 is a cross-section of the novel cushion valve of FIG. 3, the valve being in an closed position;

FIG. 23 is an perspective view of another exemplary embodiment of a valve of the present invention attached to a peripheral edge of an inflatable cushion;

FIG. 24 is an upside down, exploded view of another exemplary embodiment of a valve of the present invention;

FIG. 25 is a top plan view of the slide housing of the valve of FIG. 23;

FIG. 27 is an exploded view of the slide housing and slide;

Corresponding reference numerals refer to corresponding elements of the invention throughout the accompanying drawings.

DESCRIPTION OF THE PREFERRED EMBODIMENT

Figure 1:
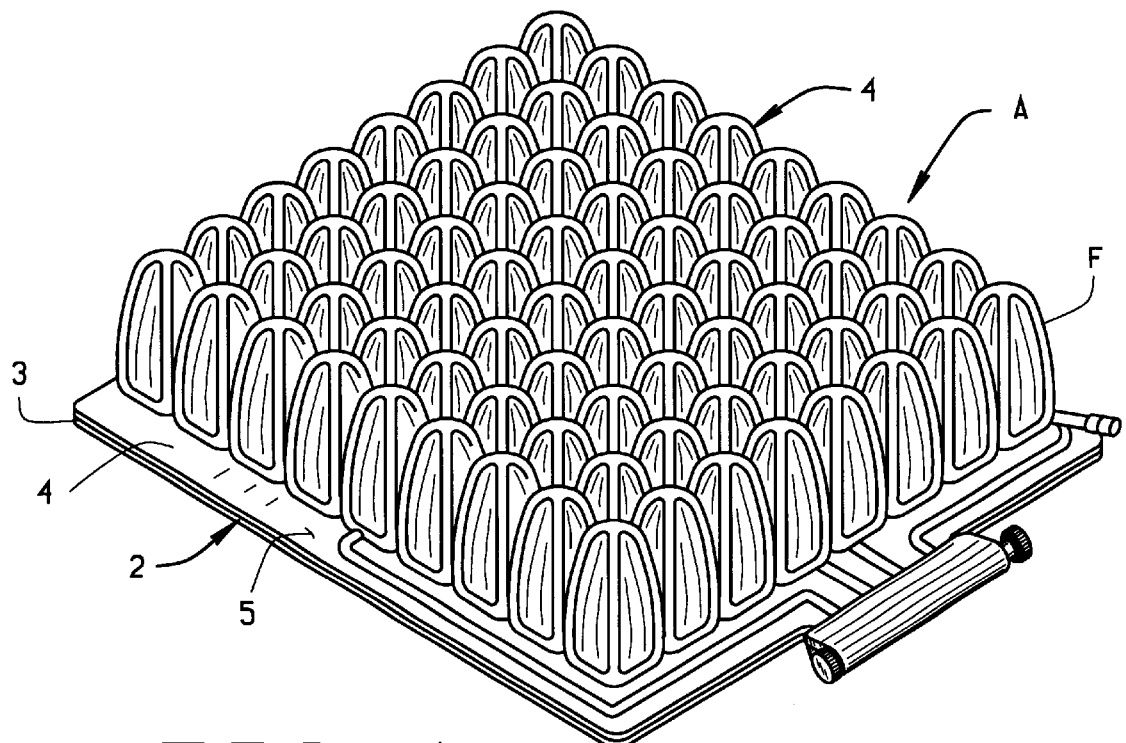
FIG. 1 is a top perspective view of a cushion employing a novel cushion valve of the present invention.
Figure 2:
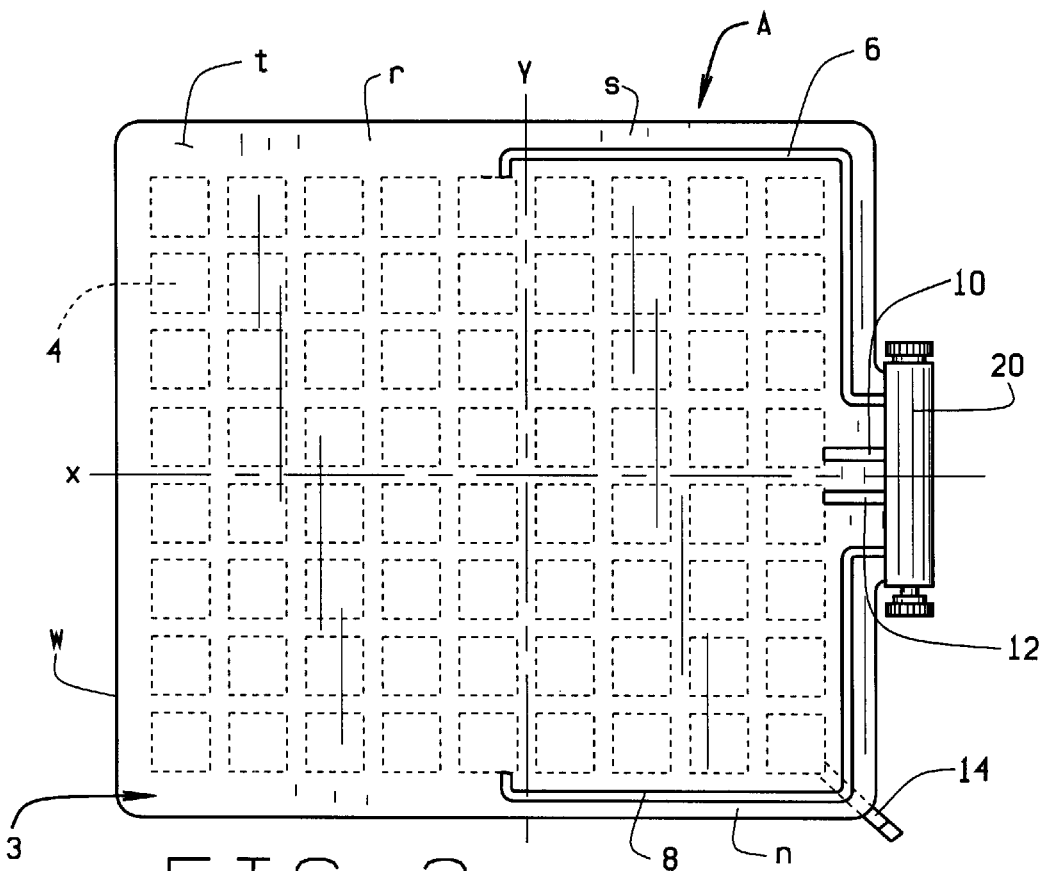
FIG. 2 is a bottom plan view of the cushion and cushion valve shown in FIG. 1.

Referring now to the drawings (FIGS. 1–4), the letter A designates one exemplary embodiment of a cellular cushion which is highly flexible and is designed for use on an underlying supporting surface, such as the seat of a wheelchair, the seat of a vehicle or the seat of a conventional chair. Being cellular, cushion A distributes the weight of its occupant generally uniformly over the entire area of the buttocks and thereby dissipates the pressures resulting from the supported weight of the ischia, that is, the bony prominence of the buttocks. It further has the capacity to position and stabilize the user. It will be appreciated that although the present invention is described as employed on a cushion, the novel valve assembly can also be employed with an air mattress or air mattress section or other similar devices that include inflatable zones.

The cushion A includes a base 2 and air cells 4 that project upwardly from the base 2. Generally the air cells 4 are molded as a conformal having a web 5 interconnecting the cells 4. The base is comprised of the web and a backing 3. Both the backing 3 and the air cells 4 preferably can be molded or otherwise formed from a highly flexible neoprene. The cells 4 and web 5 may be formed over a mandrel in a dipping operation as described in U.S. Pat. No. 4,541,136. On the other hand, the air cells 4 can be molded from a highly flexible neoprene and the base 2 can be vacuum formed of the web and a backing formed from polyurethane, for example, and appropriately attached to the conformal.

The base 2 generally is rectangular and the cells 4 are arranged on it in longitudinal and transverse rows, with each cell occupying both a longitudinal and a transverse row. It will be appreciated that although the illustrated embodiment provides for individual cells each having a configuration consisting of four fins F, the configuration of the individual cells is incidental to the invention. The present invention can be used with a cushion employing any preferred configuration of cells 4, that is, for example, cells having any number of fins or sides, cells having no fins, for example, cylindrical , cubical cells or rounded cells.

The cells 4 are further arranged in zones, typically four zones r, s, t and u. The zones r and s lie side by side at the front of the cushion A and the zones t and u exist side by side at the rear of the cushion A. The right zones r and u are separated from the left zones s and t along a longitudinal axis x, whereas the front zones r and s are separated from the rear zones t and u along a transverse axis y. More or fewer zones and differing arrangements of those zones may be employed.

Within the base 2 the cells 4 of the zone r communicate with each other, so that all exist at the same general internal pressure irrespective of how far any individual cell is depressed. The same holds true with regard to the cells 4 of the zone s, the cells 4 of the zone t, and the cells 4 of the zone u. In other words, the cells 4 of zone r are normally isolated from the cells of the remaining zones s, t and u. Likewise, the cells 4 of the zone s are normally isolated as are the cells 4 of zones r, t and u and so forth. Thus, the cells 4 of each zone r, s, t and u collectively define a separate inflation zone or compartment.

A fluid conduit 6 extends from zone t toward the front of the cushion. Likewise a fluid conduit 8 extends from zone u to the front of the cushion. Two shorter conduits 10 and 12 extend from zones s and r respectively toward the front of the cushion. The conduits 6, 8, 10 and 12 all terminate near an edge of the cushion and are in fluid communication with the cushion valve of the present invention, as will be explained in detail below. It also will be appreciated that the various conduits can be formed in any appropriate manner without departing from the scope of the invention. For example, the conduits can be formed integrally in the base 2 when the base is molded or vacuum formed.

The illustrated embodiment is one acceptable configuration of conduits. The conduits can be formed in any acceptable manner that results in access to the conduits at one location on the periphery of the cushion so that valve of the present invention can be utilized. By way of example, the conduits can be formed into the web 5 or can comprise separate tubing without departing from the scope of the invention. An air filling valve 14 is located at zone r that is opened and closed simply by turning its end. It will be appreciated, however, that the air fill valve can be located at any desirable and convenient location on the cushion.

The conduits 6, 8, 10 and 12 are operatively connected to a novel valve 20, which is one primary aspect of the present invention. As will be explained in detail hereinafter, when closed, the valve 20 isolates the cells 4 of the several zones r,s,t and u. But when opened, it interconnects the zones r, s, t, and u, so that the interiors of all the cells 4 in all zones are in communication and, therefore, all exist at the same internal pressure. The air filling valve 14 enables air to be pumped into the cells 4 of the zone in which it is located and, when the valve 20 is open, the air inflates the cells 4 of all of the zones r, s, t and u. Use of only one air-filling valve 14 insures all of the cells 4 in the zones r, s, t, and u will be at the same initial pressure, even though the volume of air in the cells or zones may vary in use.

One embodiment of the novel valve 20 will now be described in greater detail with particular reference being paid to FIGS. 3–13. In the illustrated embodiment of the cushion there are four air conduits 6, 8, 10 and 12 that are in fluid connection with the four zones r, s, t and u respectively. This is accomplished by having a first end of each conduit terminate in a cell 4 of one zone. The opposite or second end of the conduit is in fluid connection with valve 20, as shown. In the exemplary embodiment of FIGS. 3–5, the valve 20 includes a casing 22 with a longitudinal inner bore 24. The bore 24 of the illustrated embodiment has a circular cross section, but could be ovoid, rectangular, triangular or any other cross-sectional configuration, as can be the casing and the slide itself. The casing 22 also includes a series of open-ended channels 26, 28, 30 and 32 which are perpendicular to, and open into, bore 24. The open-ended channels are dimensioned to securely and snugly seat adjacent the second ends of the conduits (see FIG. 6).

The channels 26, 28, 30 and 32 are positioned along the length of the bore 24 at predetermined intervals. The second ends of the conduits can be pressure fit into the channels, glued or otherwise secured within the channels. Valve 20 also includes a slide 34, which is movably engaged in bore 24. As shown, slide 34 also has a cylindrical cross section (or any other cross section complementary to the cross section of casing bore 24) and has a diameter slightly less than the diameter of bore 24 so that slide 34 can move axially within bore 24. Slide 34 has an inner bore 36, which extends the axial length of the slide.

Slide 34 has as series of ports or openings 38, 40, 42 and 44 which open into, and are in fluid communication with, inner bore 36. The openings 38, 40, 42 and 44 are positioned along the length of bore 36 at predetermined intervals with the spacing between the openings corresponding to the spacing between the channels 26, 28, 30 and 32, respectively, of the casing 22. In the illustrated embodiment, "O" ring seals 46, 48, 50, 51, 52, 54, 56, 58, 60, 61 are position, generally in grooves or seats, on each side of the respective slide openings to make a fluid or air tight seal around the openings. The "O" ring seals define small, discrete air chambers C-1, C-2, C-3 and C-4 around each opening 38, 40, 42 and 44, respectively along the slide. The slide 34 is plugged at each end with plugs 62 and 64. Plugs 62 and 64 not only plug or seal the ends of bore 36, but also provide a convenient and ergonomically satisfying structure for the user to grasp or touch to manipulate the slide 34, and also operate as stops when the slide is manipulated within the casing bore, as will now be explained.

As explained above, when closed, the valve 20 isolates the cells 4 of the several zones r, s, t and u. But when opened, valve 20 interconnects the zones r, s, t, and u, so that the interiors of all the cells 4 in all zones are in communication and, therefore, all exist at the same internal pressure. FIG. 4 shows valve 20 in an open position. To achieve the open position, the user moves or shifts slide 34 until plug 62 abuts the casing so air chambers C-1, C-2, C-3 and C-4 with openings 38, 40, 42 and 44, respectively, opening into the chambers, are aligned, and in registry with, openings 26, 28, 30 and 32, respectively, of the casing placing openings 38, 40, 42, 44 and openings 26, 28, 30, 32 in fluid communication.

In the open position, the respective inflation zones are in fluid communication with each other via conduits 6, 8, 10 and 12 through bore 36 of the slide. FIG. 5 illustrates valve 20 in a closed position. The user moves slide 34 in the opposite direction until plug 64 abuts casing 22. The air chambers C-1, C-2, C-3 and C-4 of the slide are out of alignment with the openings of the casing thereby sealing off the ends of conduits 6, 8, 10 and 12.

Figure 6:
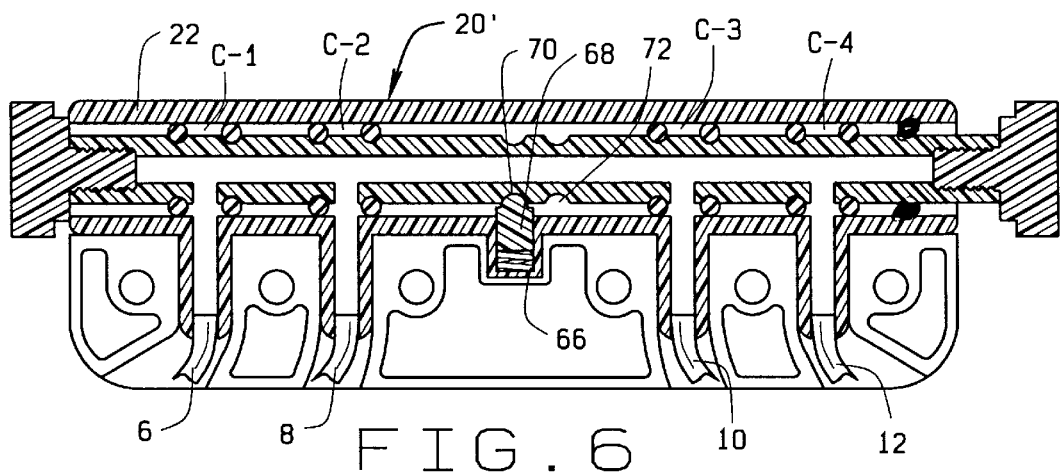
FIG. 6 is a cross-section of another embodiment of the novel cushion valve of FIG. 3, the valve being in an open position.
Figure 7:
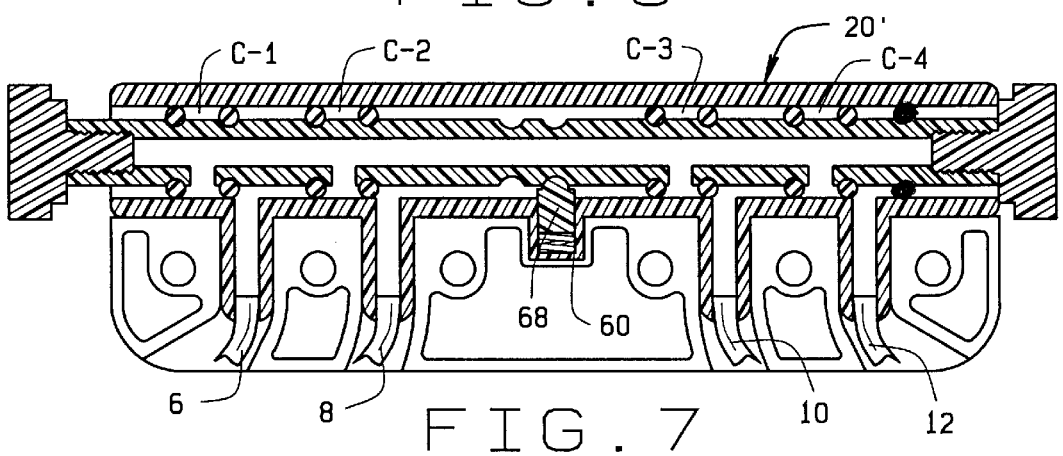
FIG. 7 is a cross-section of the novel cushion valve of FIG. 6, the valve being in an closed position.

FIGS. 6 and 7 illustrate another exemplary embodiment of the valve 20, indicated generally as valve 20'. Valve 20' comprises the functional parts of valve 20. However, the interior of casing 22 includes a small lateral orifice 66 which opens into bore 24. A spring-biased rounded detent 68 is seated in orifice 66. Slide 34 includes a first circumferential groove 70 and a second circumferential groove 72. When the slide 34 is in a first or open position (FIG. 6) the detent 68 is biased into groove 70. When the slide is moved to a second or closed position (FIG. 7), the detent is biased into groove 72. This arrangement serves to important functions: first, combination of the detent and grooves secures the slide in the desired position and, secondly, the audible and/or palpable "click" of the detent into the groove allows the user to be reasonably certain that the slide 34 is in its desired position.

Figure 8:
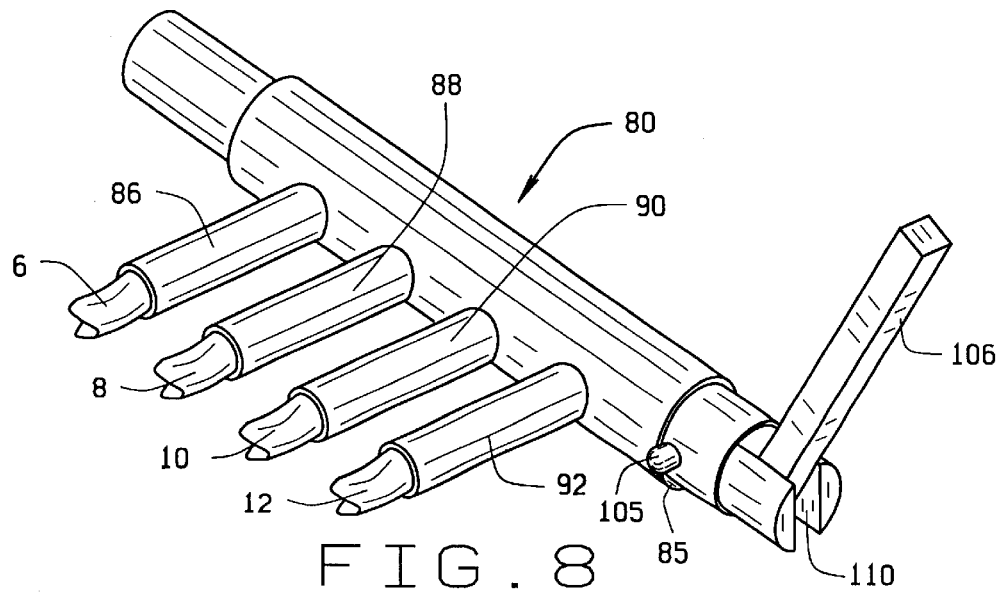
FIG. 8 is an enlarged perspective view of another representative embodiment of the novel cushion valve of the present invention.
Figure 9:
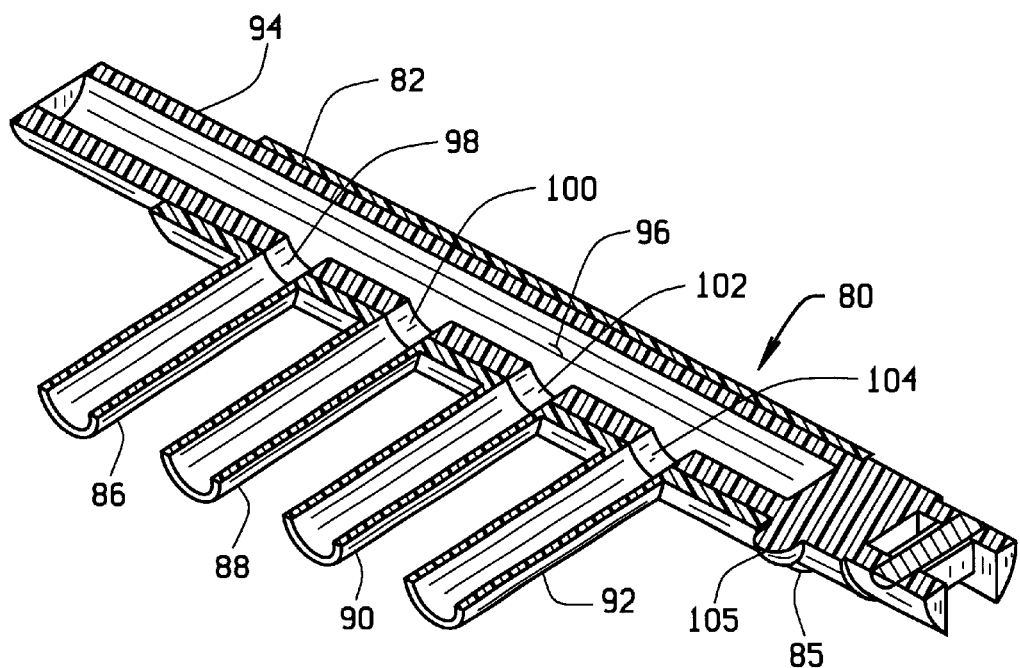
FIG. 9 is a cross-sectional view of the novel cushion valve of FIG. 8, the valve being in an open position.
Figure 10:
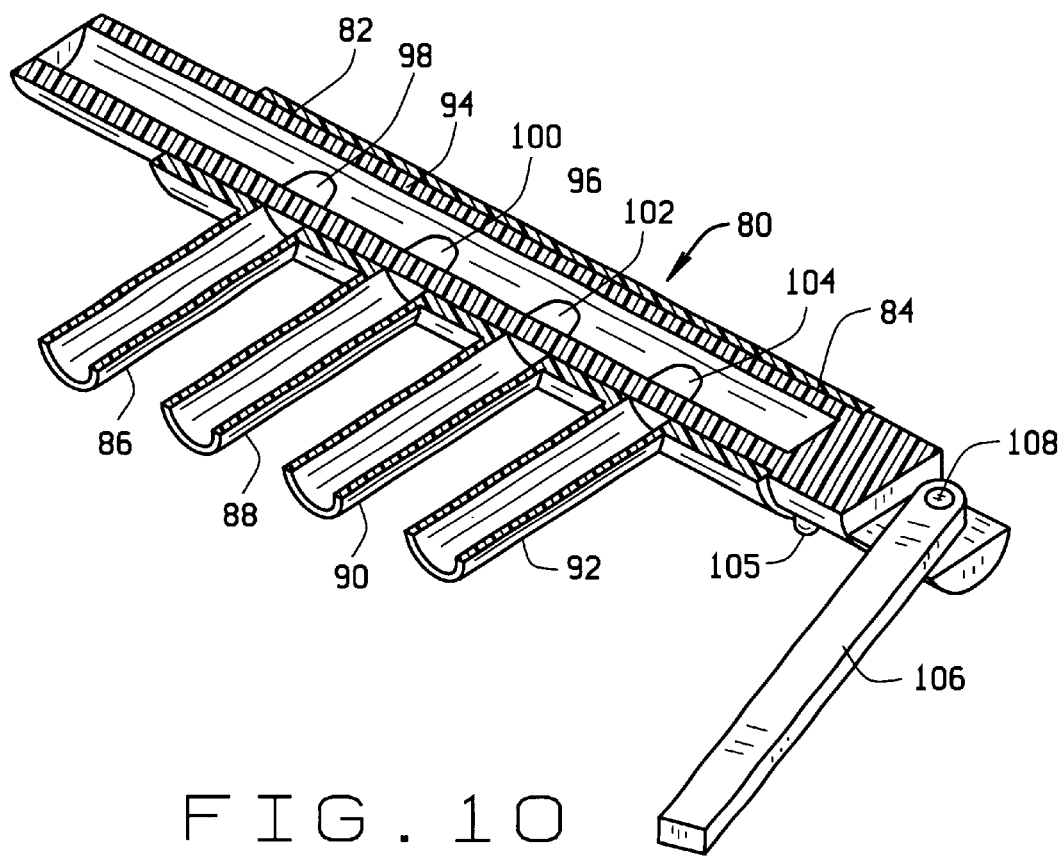
FIG. 10 is a cross-sectional view of the novel cushion valve of FIG. 8, the valve being in a closed position.

FIGS. 8 through 10 illustrate another exemplary embodiment of a valve of the present invention, indicated generally by reference numeral 80. Valve 80 includes a casing 82 having cylindrically shaped longitudinal inner bore 84. As illustrated, casing 82 is cylindrical in cross section, but that is not mandatory. It is required, however, in this particularly embodiment, that the bore 84 be substantially cylindrical. The casing is notched, as at 85. There are a series of tubular connectors 86, 88, 90, 92 spaced along the length of casing 82. There are ring seals 93 at the juncture of the connectors and bore 84. It will be appreciated that the respective tubular connectors are open ended. The conduits 6, 8, 10 and 12 are secured in the first or free open end of the connectors, as shown in FIG. 8. The second open end of each tubular connector opens into, and is in fluid cooperation with, bore 84 of the casing.

A slide 94 is rotatably seated in bore 84. As will be appreciated, slide 94 has a substantially cylindrical cross section and is seated snugly within bore 84. The slide does not move axially in this bore. Slide 94 includes a closed ended, longitudinal inner bore 96. There are a series of openings 98, 100, 102 and 104 spaced along the length of slide 94. As will be appreciated, openings 98, 100, 102 and 104 are positioned adjacent to connectors 86, 88, 90 and 92, respectively. There is a detent knob 105 on the outer surface of slide 94 and is position in the notch 85. Slide 94 includes a handle 106 at one end. As illustrated, handle 106 is attached to a pivot 108 within gap 110 formed in one end of the slide. The handle also can be of any useful structure and is not limited to the pivotable handle 106. For example, a knob, a wheel, a lever or any other apparatus for rotating the slide may be used.

As shown in FIG. 9, the user can grasp handle and rotate the slide 94 about its longitudinal axis within bore 84 so that the openings 98, 100, 102 and 104 are in registry with the connectors 86, 88, 90 and 92, respectively, thereby opening valve 80. The detent knob 105 will abut the notch 85 edge so that it is not rotated too far to take the openings and connectors out of alignment. As shown in FIG. 10, the slide 94 can be rotated within bore 84 so that the openings 98, 100, 102 and 104 are rotated out of registry with the connectors, thereby allowing the slide to seal off the connectors to close the valve. In the closed position the detent knob 105 will abut the other side of notch 85. The user can be assured that rotating to this stop position closes the valve.

Figure 11:
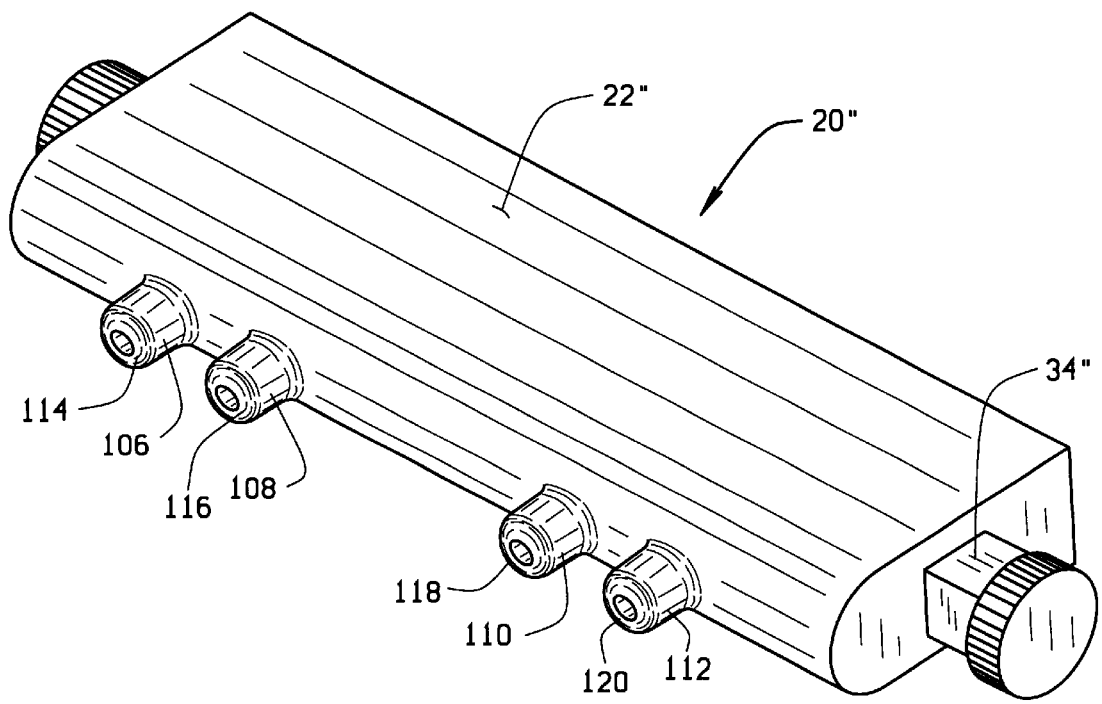
FIG. 11 is an enlarged perspective view of another representative embodiment of the novel cushion valve of the present invention.
Figure 12:
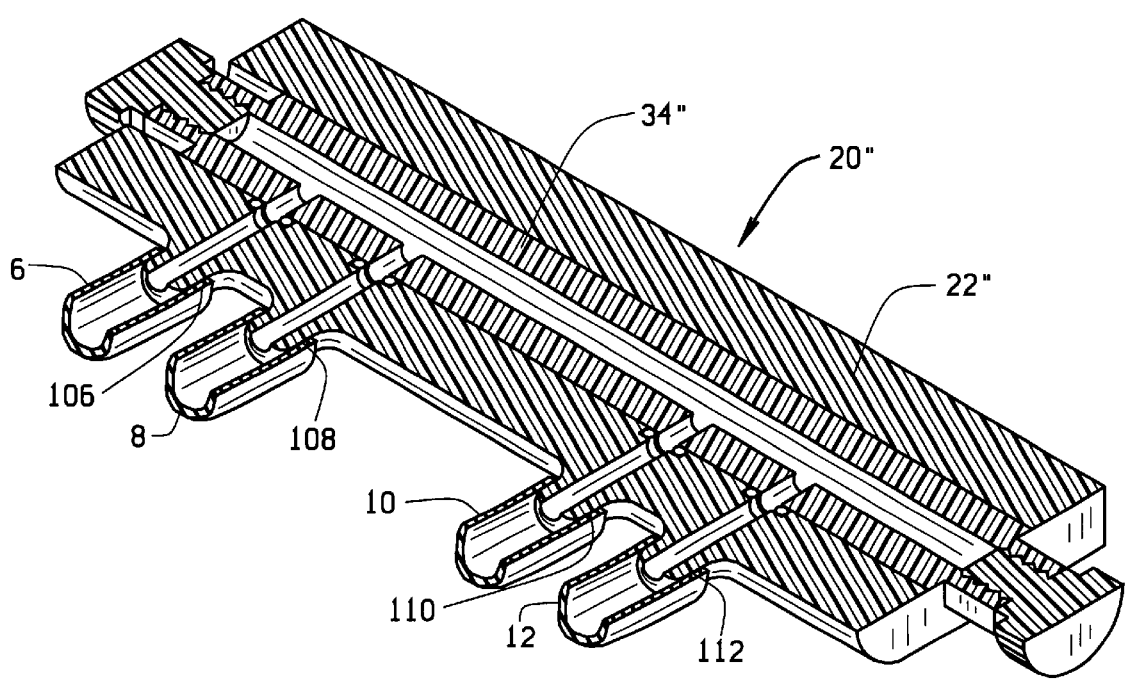
FIG. 12 is a cross-sectional view thereof, the valve being in an open position.

FIGS. 11 and 12 illustrate yet another illustrative embodiment of valve 20 (FIGS. 3–5), indicated generally by reference numeral 20". It will be appreciated that valve 20" operates in the same manner as does valve 20 and also may include the detent/groove apparatus of valve 20'. The casing 22" of valve 20, however, has flatter profile. It will be noted that casing 22" includes short open-ended connectors or nipples 106, 108, 110 and 112 for the connection of conduits 6, 8, 10 and 12, respectively. The slide 34" seats within the casing bore in a much tighter fit, that is, there is very little clearance between slide 34" and the walls of the casing inner bore. This relatively tight friction may eliminate the need for O-ring seals on each side of the slide openings. However, in the illustrated embodiment, seals, such as seal 113, are included. Also, as can be seen, the connectors 106, 108, 110 and 112 have rounded external ends 114, 116, 118 and 120, respectively, which allows them to be introduced into the open ends of the conduits 6, 8, 10 and 12, as shown in FIG. 12.

Figure 13:
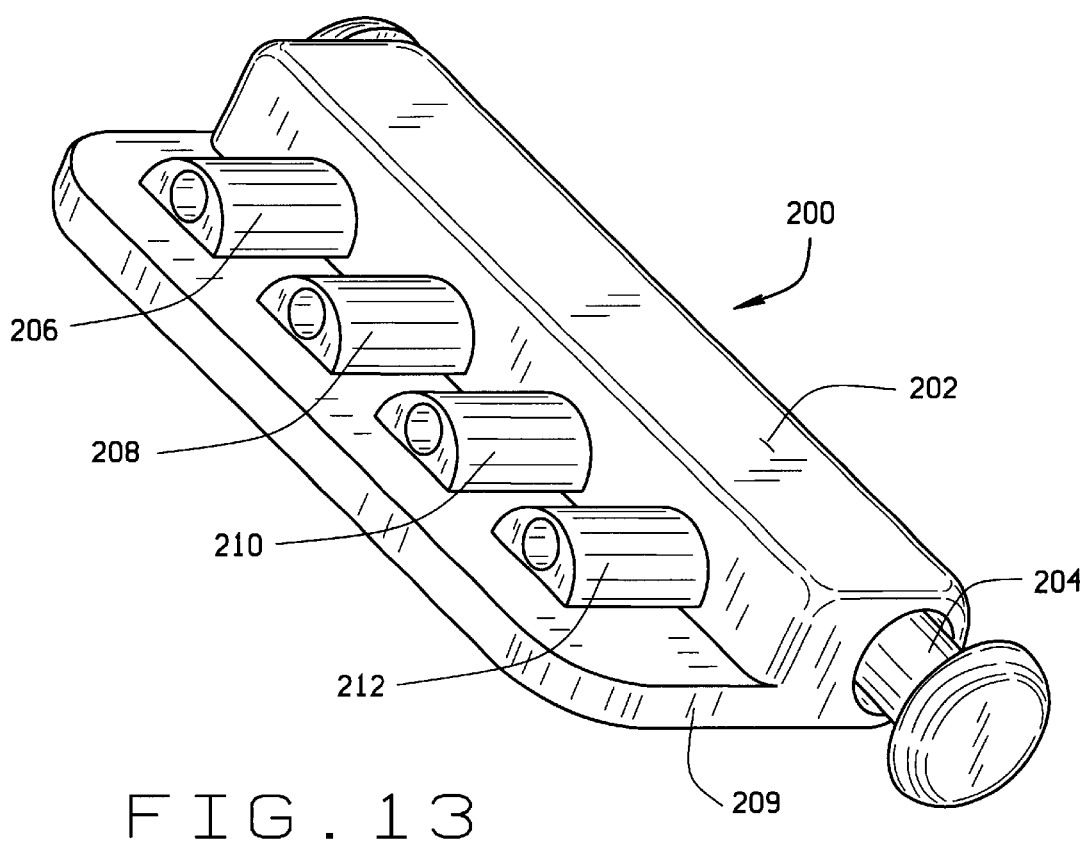
FIG. 13 is an enlarged perspective view of another representative embodiment of the novel cushion valve of the present invention.

FIG. 13 illustrates another exemplary embodiment of valve 20, indicated generally by reference numeral 200. Valve 200 functions in the same manner valve 20 and also may include the internal detent/groove apparatus of valve 20'. Valve 200 includes a low profile casing 202. Casing 202 has an inner bore (not shown), as illustrated with regard to the other embodiments. A slide 204 is slidingly engaged within the casing bore and is constructed and function in the same manner as previously described with regard to valves 20, 20' and 20". Casing 202 has a flat base extension 204. A series of conduit connectors 206, 208, 210 and 212 are positioned along the base extension 204. The conduit connectors function in the same manner as conduit connectors previously described.

Figure 14:
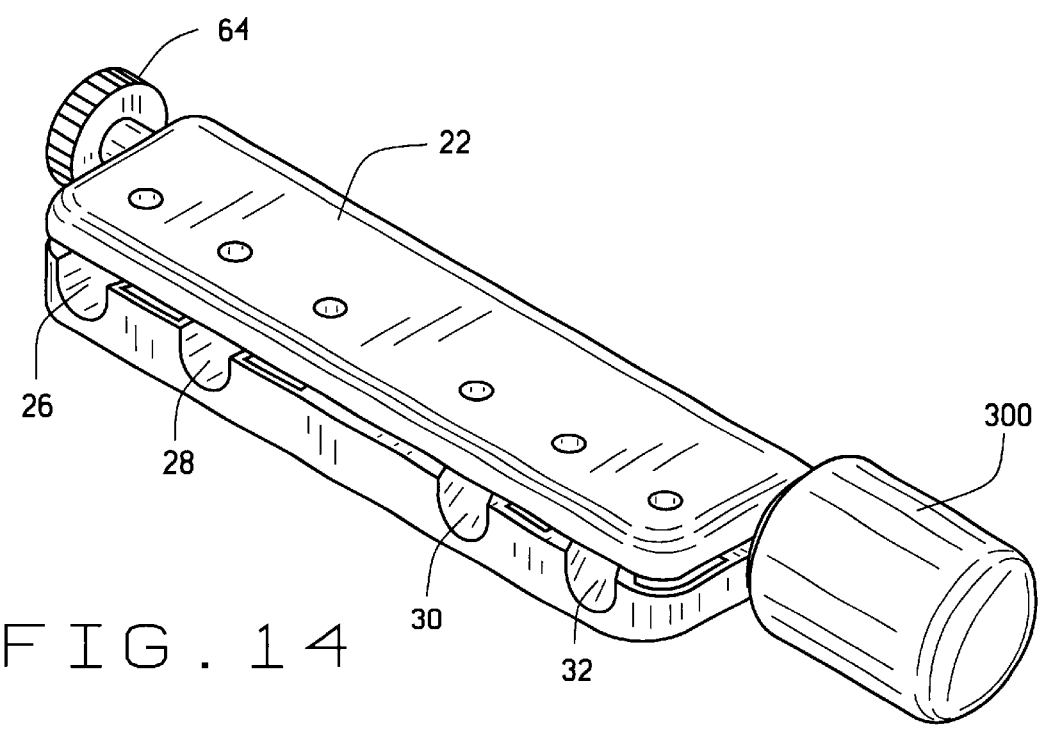
FIG. 14 is an enlarged perspective view of a valve, as shown in FIG. 3, including a servo slide actuator.

It will be appreciated that components of the various embodiments of the novel valve can be molded from, or formed or constructed from, any appropriate material such as polyethylene, lightweight durable metal or the like. Moreover, it also would be possible to construct the valve so that the slide is solenoid or servo activated to avoid hand manipulation. One such illustrative embodiment is shown in FIG. 14. A servo actuator 400 is connected to the slide. One type of actuator is a double acting coil. When one coil is energized, the spool is shuttled in one direction, for example to open the valve. When the other coil is energized, the spool is shuttled in the opposite direction. The servo can be energized by any appropriate means known to the art including battery power.

The illustrated valves are constructed to communicate with four conduits in a cushion having four inflation zones. It also will be appreciated, however, that the novel cushion valve can include any number of channels in order to function with cushions that have a greater or lesser number of individual inflation zones. For example, if the cushion had only two zones, the valve would be configured to accommodate two conduits. This can be accomplished by forming the valve with only two channels or by plugging two unused channels of a four channel valve. Furthermore, for example, if the valve is used with a cushion having six individual inflation zones, the valve would include six channels for connection to the conduits.

Operation

In order to prepare the cushion A for the user, the valve 20, 22' 22" or 80 is opened as shown in FIGS. 4, 6, 9, or 12. Opening the valve opens the conduits 6, 8, 10 and 12 and thereby allows the conduits to be in fluid communication with the bore of the valve slide which places the four zones r, s, t and u in communication through the valve slide bore. The air-filling valve 14 is opened and air is pumped into it with a pump which connects to the valve 14. The air initially flows into the cells of zone r, but since the cells of the remaining zones s, t and u are in communication with the cells of zone r through the open valve, all of the cells 4 are inflated and the cells 4 reach a state of equilibrium. Enough air is pumped into the cushion A to exceed the requirements for supporting the user. The valve 14 then is closed and the pump removed.

Next the over-inflated cushion A is place on the supporting surface upon which it is to rest when supporting a user. The user then sits upon the cushion A in the location he or she expects to assume and slowly releases air from the air filling valve 14 to immerse the user. As air is released, the user's buttocks sink deeper and deeper into the array of cells 4, and they tend to envelop and assume the contour of the buttocks. Enough air is released to bring the region of the ischia to within about ½ inch of the base 2. Of course, as air flows out of the cushion A all of the cells 4 remain at essentially the same internal pressure because they are interconnected through the open valve. When the user achieves the desired immersion, the air filling valve 14 is closed.

While immersed in the cells of the cushion A, the user moves, or is moved by others, to the posture desired to be maintained for an extended period and this causes a redistribution of air amongst the cells 4 of the several zones r, s, t and u. In time, the cells 4 of the several zones r, s, t and u reach equilibrium, that is to say, the flow between the zone r, s, t and u ceases. At this time the valve slide is manipulated to a closed configuration. (FIGS. 5, 7, 10), thereby preventing air flow through the slide bore and thus isolating the zones r, s, t, and u.

The isolated zones r, s, t and u impart stability to the cushion A, and this serves to maintain the user in the selected posture. Thus, as the user attempts to assume a different posture, he or she will encounter greater resistance from cells 4 of one or more of the zones r, s, t and u, and they will urge the user back to the initial posture. By varying the volume of air between zones, for example, one can accommodate for physical deformities while still maintaining satisfactory protection against pressure sores. The capacity to maintain a selected posture is particularly useful with users who suffer from spinal deformities and for those whose muscles have atrophied.

Figure 15:
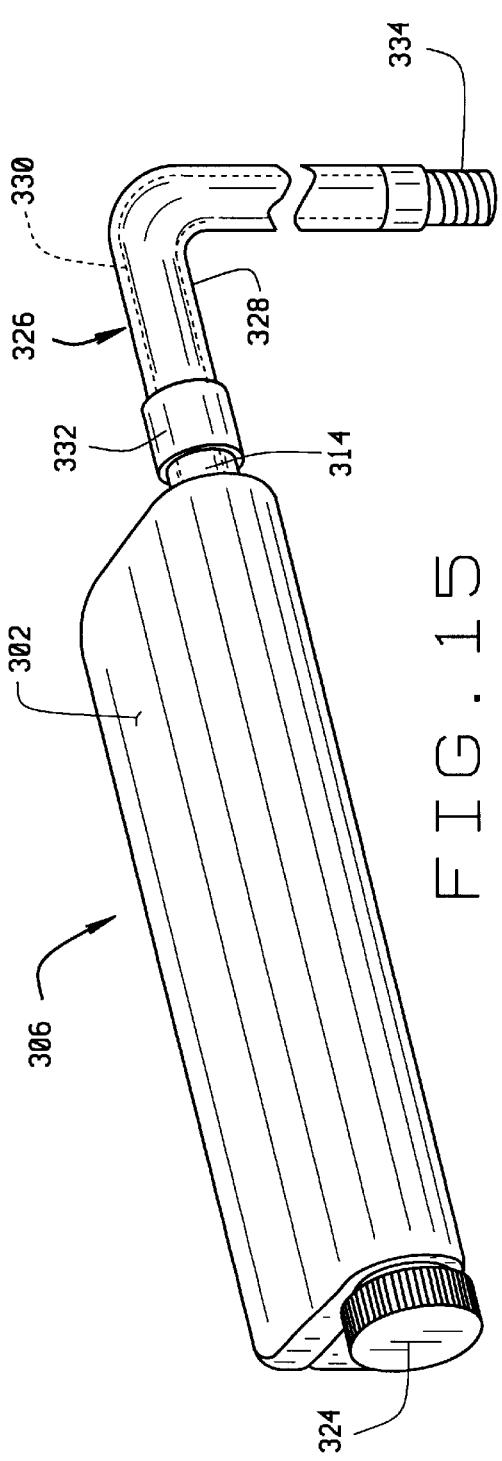
FIG. 15 is perspective view of an exemplary embodiment of the novel cushion valve having an air inflation apparatus at one end.
Figure 16:
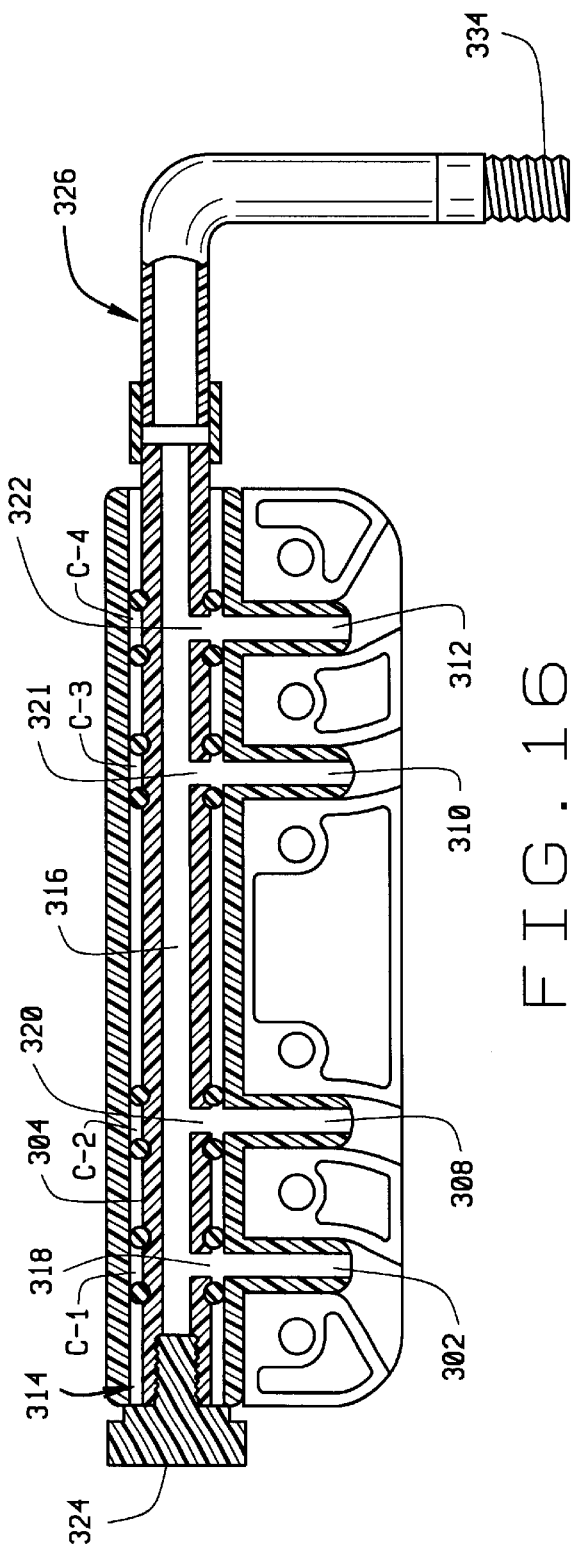
FIG. 16 is a cross-sectional view of the exemplary cushion valve of FIG. 15.

FIGS. 15 and 16 illustrate an exemplary embodiment of the novel valve of the present invention, indicated generally by reference numeral 300 designed to allow inflation of zones r, s, t and u through the valve slide. As shown, the valve 300 is constructed similarly to the valve illustrated in FIGS. 3 and 4 and has a casing 302 with an inner bore 304. The casing includes the open-ended channels 306, 308, 310 and 312 which open into bore 304. A slide 314 with inner bore 316 is movably positioned within bore 304. Slide 314 has a series of short channels 318, 320, 321 and 322 which communicate with bore 316. The slide functions to equalize pressure within the four zones r, s, t and u as previously described. However, slide 314 has a plug 324 at one end and an inflation apparatus 326 at the other end. In the illustrated embodiment, the inflation apparatus 326 comprises tubing 328 having an inner bore 330, a fitting 332 at one end to connect the hose to the slide and a conventional filling valve 334 at the opposite end. Tubing bore 330 is in fluid communication with bore 316. As can be appreciated, valve 334 is attached to an air source, (not shown) such as a pump or air tank to provide airflow through the tubing, the slide channel and the respective conduits to inflate the cushion to a desired initial pressure. The inflation apparatus 326 provides easier access for inflation when the cushion is used as a conventional wheelchair cushion.

Another illustrative use of the inflation apparatus with the valve is in an inflatable seat cushion employed in a vehicle, such as a truck. The apparatus can be connected to an air source in the truck. Valve 300 is opened by manipulating slide 314 so that the air from the air source flows into the four zones r, s, t and u substantially simultaneously to inflate the cushion. When the cushion is appropriately inflated and the user positioned, valve 300 is closed. Apparatus 326 can be removed from the air source and filling valve 334 closed, if desired.

It will be appreciated that a filling valve 334 can be attached directly to the slide if the tubing is not desired. Also, an inflation apparatus can be employed with any of the described valve embodiments included herein. It is described in use with valve 300 for purposes of clarity and brevity. Likewise, inflation apparatus 326 is one exemplary embodiment of an inflation apparatus and the term inflation apparatus as used herein and in the appended claims, is intended to encompass any apparatus that can be associated with the slide bore of any of the described valves to allow inflation of the zones r, s, t and u through the valve.

Figure 17:
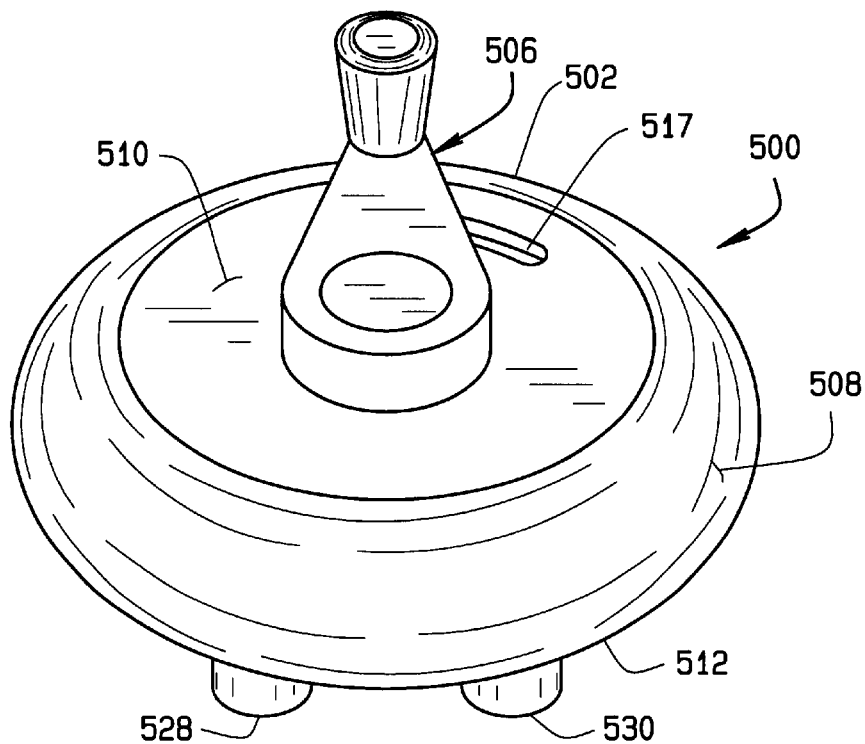
FIG. 17 is a perspective view of another exemplary embodiment of a valve of the present invention.
Figure 18:
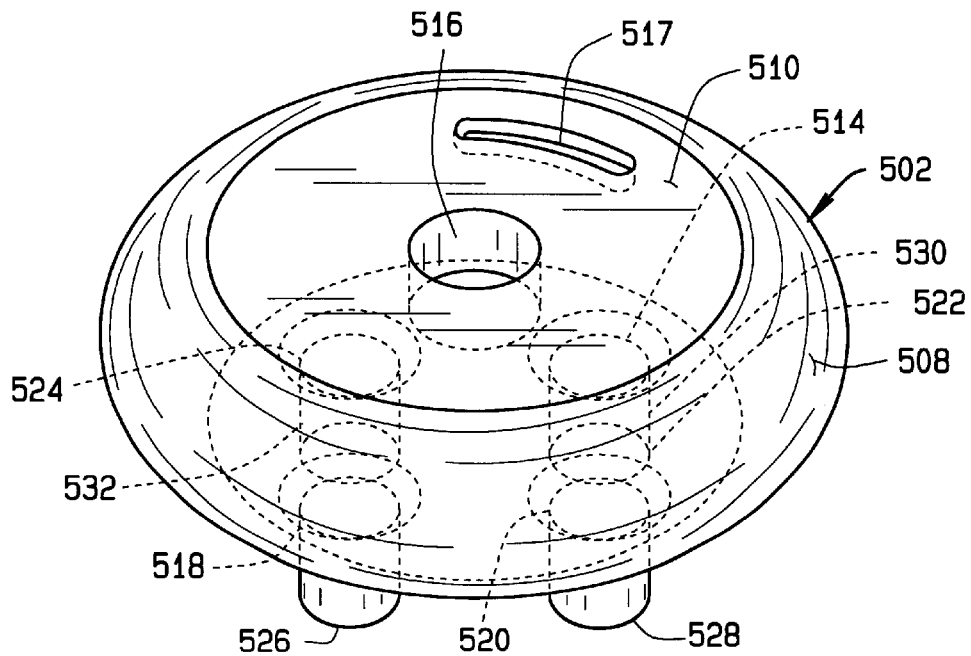
FIG. 18 is a perspective view of the housing of the valve of FIG. 17.

Another exemplary embodiment of a valve of the present invention is indicated generally by reference numeral 500 in FIG. 17 and functions with the inflatable apparatus in the same manner described above with reference to the other exemplary embodiments. Valve 500 has a round, somewhat flat configuration and comprises a casing 502, a slide 504 within the housing (FIG. 19) and an actuator 506 operatively connected to the slide. Housing 502 is shown in greater detail in FIG. 18. Casing 502 has a substantially round or disk-like configuration and includes a circumferential wall 508, a top wall 510 and a bottom wall 512. The recited walls define a circular inner chamber 514. There is an opening or hole 516 through the top wall. There also is shallow an arcuate detent groove 517 in the top wall.

The bottom wall 512 includes four evenly spaced apart openings or holes 518, 520, 522 and 524 that are in fluid communication with chamber 514. In the illustrated embodiment, the openings 518, 520, 522 and 524 include short tubular extensions 526, 528, 530 and 532 respectively. The tubular extensions are connected to the cushion conduits in a manner similar to that described above. The housing could be fabricated without the extensions and the conduits connected directly to the openings in the bottom wall.

Figure 19:
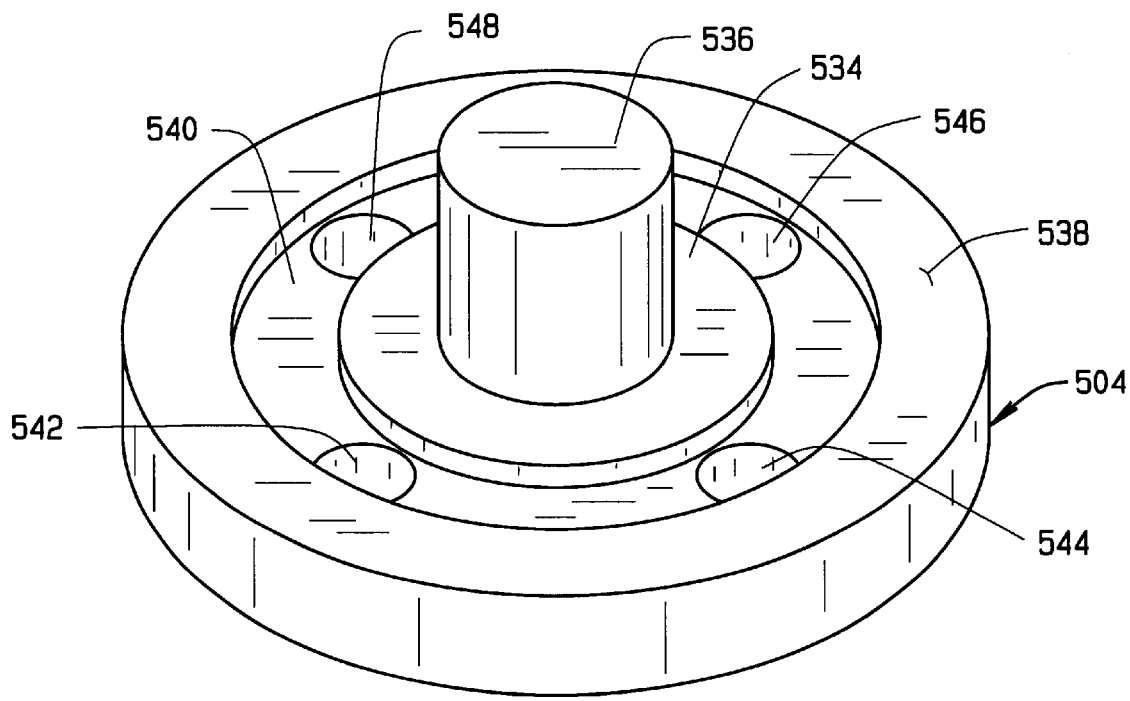
FIG. 19 is a perspective view of the slide of the valve of FIG. 17.

Slide 504, seen best in FIG. 19, is rotatably seated in chamber 514. Slide 504 has a circular or disc-like configuration and is sized to seat within chamber 514. Slide 504 has a concentric hub 534 with a protruding actuator shaft 536. Shaft 536 fits through hole 516 in the top wall of the housing and can be appropriately sealed if required. Slide 504 has a peripheral margin 538 with an annular depression or groove 540 formed between the margin and the hub. There are four equally spaced apart holes 542, 544, 546 and 548 formed through the slide in groove 540.

Figure 20:
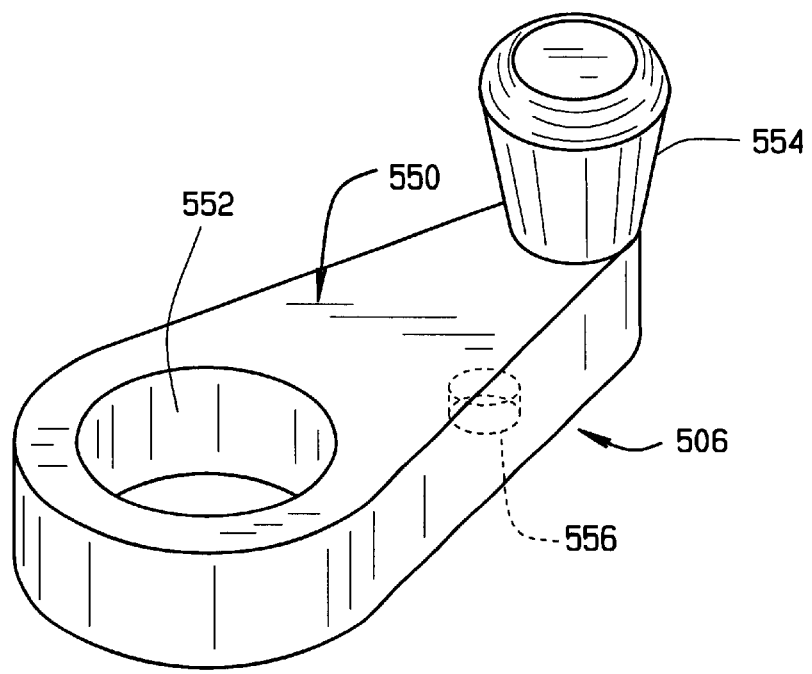
FIG. 20 is an actuator.

Actuator 506, best seen in FIG. 20, includes an arm 550 having a hole 552 through a first end and a handle 554 extending up from the top surface of the second end. Hole 552 is dimensioned to mount on stem 536. There is a detent 556 on the bottom surface of arm 550 adjacent handle 554. The detent is positioned to engage groove 517. Actuator 506 is one exemplary embodiment of an apparatus used to effect movement of the slide within the casing. The term actuator as used herein is intended to include any apparatus or element which can effect movement of the slide within the casing.

Figure 21:
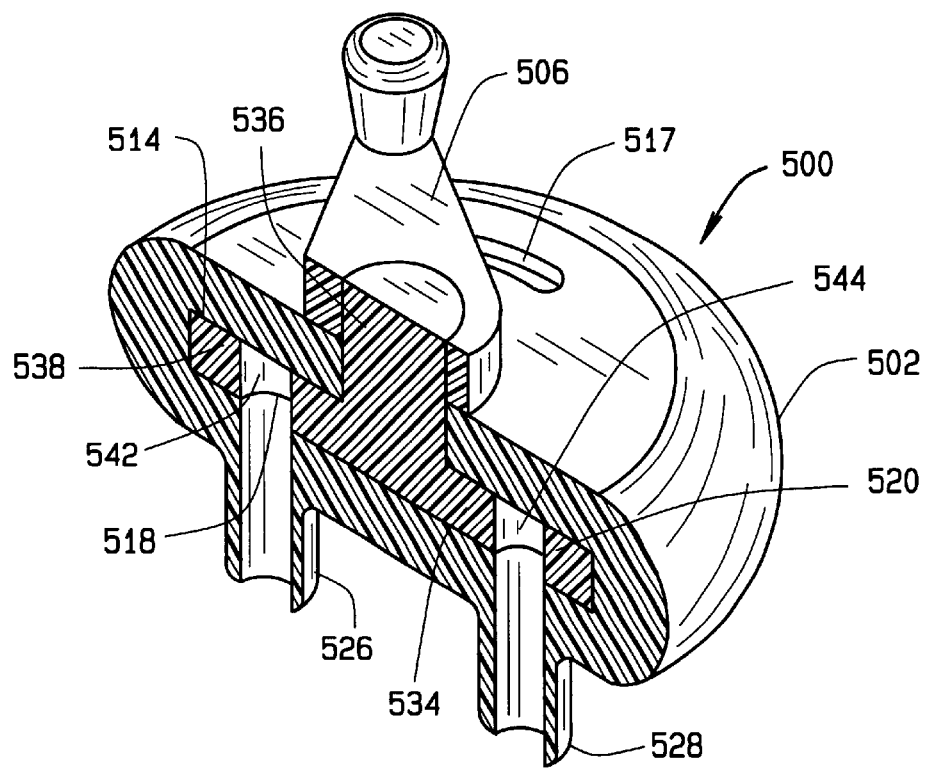
FIG. 21 is a cross-sectional view of the valve of FIG. 17 in an open position.
Figure 22:
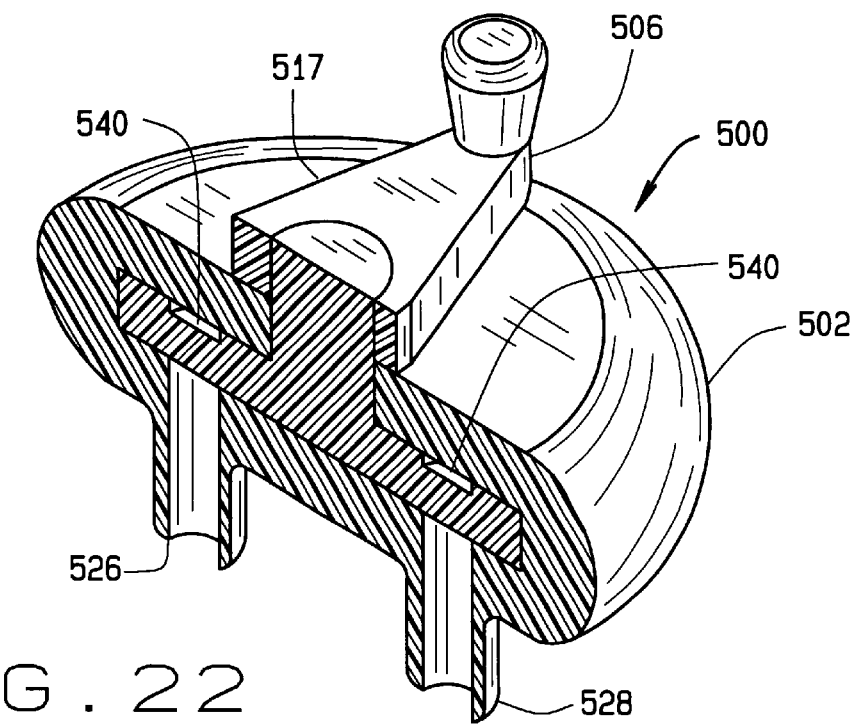
FIG. 22 is a cross-sectional view thereof, the valve being in a closed position.
Figure 26:
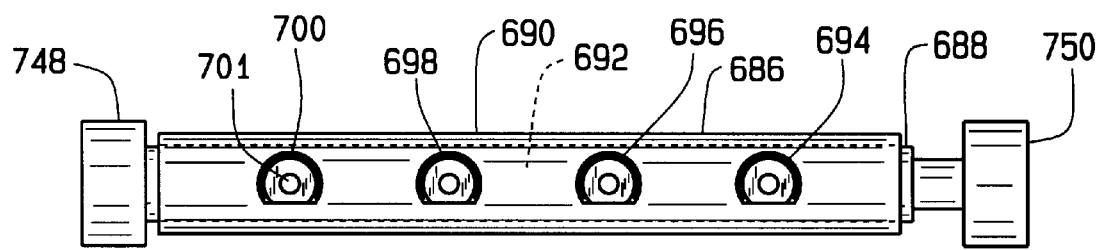
FIG. 26 is a front plan view of the slide housing of FIG. 24.

FIG. 21 illustrates valve 500 in an open position in which there is fluid communication among all four zones of the cushion. In this first position holes 542, 544, 546 and 548 are in alignment or registry with holes 518, 520, 522 and 524 in the housing. The zones of the cushion are in communication through annular groove 540. When the actuator and, consequently slide 504, is moved to the opposite direction, as shown in FIG. 22, the recited holes are moved out of alignment and communication among the zones is blocked. Detent 556 abuts one end of the detent groove 517 when the valve is opened and abuts the opposite end of the detent groove when the valve is fully closed, allowing the user to determine when the valve is open or closed.

It will be appreciated by one skilled in the art that an inflation apparatus also could be attached to valve 500 to allow inflation of all four zones of the cushion as described in detail above. Also, valve 500 can have an appropriate detent structure associated with the actuator, the slide or the casing to secure the slide in place.

The valves as described with reference to FIGS. 1–22 are the subject matter of the inventors' co-pending U.S. patent application Ser. No. 10/052,101, filed Jan. 17, 2002 and co-pending International Application WO 02/065004, filed Jan. 17, 2002, owned by a common assignee, the contents of which are hereby incorporated by reference.

Another embodiment of a novel valve for a zoned cellular cushion is indicated generally by reference numeral 600 in FIGS. 23–31. Valve 600 includes novel attachment and sealing features, which now will be explained in detail. As seen in FIG. 23, valve 600 is attached to the peripheral edge E of a cushion that includes four air conduits 6, 8, 10 and 12 which are in fluid connection with the zones r, s, t and u, as previously explained. Valve 600 includes an outer casing 602 comprising two halves or sections 604 and 606.

Figure 28:
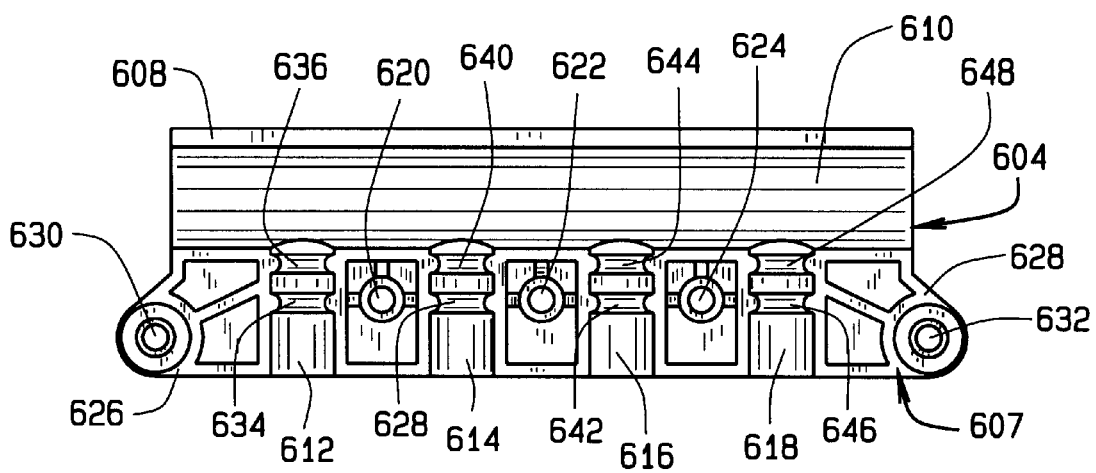
FIG. 28 is a bottom plan view of one half of the valve casing of the valve of FIG. 23.
Figure 29:
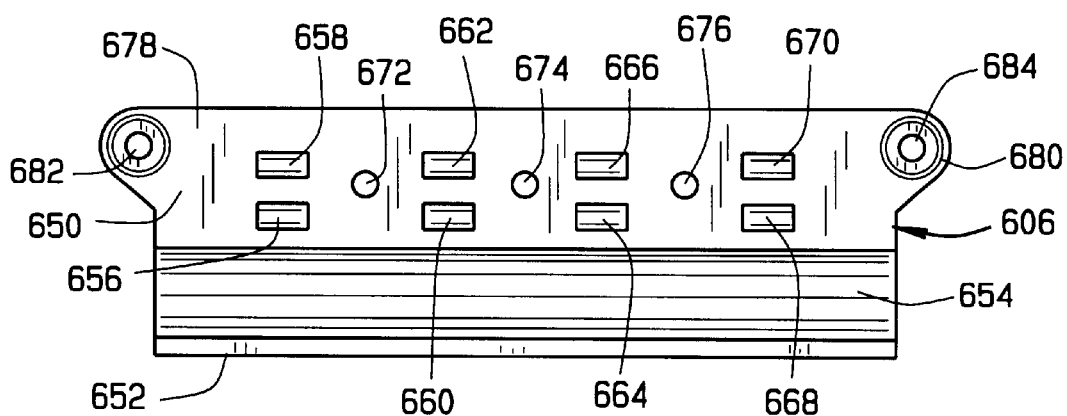
FIG. 29 is a top plan view of the other half of the valve casing.

Referring to FIGS. 24 and 28, section 604, which generally is the top section when attached to a cushion as shown in FIG. 23, has a forward segment 607 and a rear segment 608 that has a generally semi-circular cross section that defines a trough 610 that extends the length of the section. Forward section 607 has a generally greater material thickness than the rear segment, has a substantially flat outer surface 611 (FIG. 23). The inside of segment 607 has a series of equally spaced nipple connector seats comprised of depressions 612, 614, 616 and 618 in the material thickness and, in the embodiment shown, having a semi-circular cross section which are perpendicular to trough 610. In between the nipple seats are series of three equally spaced mounting holes 620, 622, 624. At one end of segment 607 is a wing 626 and at the opposite end is wing 628. Mounting holes 630 and 632 are formed in wings 626 and 628, respectively. Nipple seat 612 has a pair of spaced apart raised detents 634 and 636 formed on the surface. Likewise, nipple seat 614 includes raised detents 638, 640, nipple groove 616 includes raised detents 642, 644 and nipple seat 618 has raised detents 646, 648.

Casing half 606 has forward segment 650 which is substantially flat and rear segment 652 having a generally semi-circular cross section defining a trough 654. The overall shape of casing half 606 is complementary to that of casing half 604. The inside surface 655 of forward segment 650 has four pairs of spaced apart raised detents, 656, 658; 660, 662; 664, 666; and 668, 670. Forward segment 650 includes three equally spaced mounting holes 672, 674, 676 between the pairs of raised detents. Segment 650 includes wings 678 and 680 with mounting holes 682, 684, respectively formed therein. It will be noted that the mounting holes 672, 674, 676, 682 and 684 of casing section 604 are positioned to be in alignment with 620, 622, 624, 630 and 632 of casing section 606 when the two halves of the casing are aligned.

Troughs 610 and 654 cooperate to define a cavity 686 (FIG. 30) that extends the length of the casing (excluding the wings) when the two halves are aligned. Also, raised detents 656, 658; 660, 662; 664, 666; and 668, 670 of casing section 606 are positioned to be aligned across from the raised detents 634, 636; 638, 640; 642, 644; and 646, 648, respectively, of casing section 604 when the two casing sections are aligned in an assembled arrangement.

Valve 600 includes a slide housing 686 that fits between the two halves of the casing. The slide housing 686 and internal slide 688 are shown in detail in FIGS. 24, 25 and 27. Slide housing 686 has a casing 690 comprising a substantially cylindrical wall 690 with a longitudinal inner bore 692. The cylindrical wall 690 is dimensioned to seat in cavity 686. Slide housing 686 includes a series of connector nipples 694, 696, 698, 700 evenly spaced along its length. Each connector nipple has an inner bore, as at 701, which is perpendicular to, and opens into, inner bore 692. The respective connector nipples, in the embodiment illustrated, have a substantially semi-circular or D-shaped cross section. As best seen in FIG. 25, nipple connector 694, 696, 698, and 700 each has a pair of spaced apart circumferential retainer grooves 702 and 704, 706 and 708; 710 and 712, and 714 and 716, respectively, in external surface of the nipple connector.

The nipple connectors are designed to seat in the connector seats 612, 614, 616 and 618. The pairs of detents 634, 636, 638, 640, 642, 644 and 646, 648 formed on the surface of the connector seats align with the pairs of grooves on the rounded side of the connector seat when the connector nipples are positioned in the connector seats. The retainer grooves on the flatter side of the connector nipples align with the detents 656, 658; 660, 662; 664, 666; and 668, 670 on the surface of the second casing section 606 when the valve is assembled. The nipple connectors 694, 696, 698, 700 are dimensioned to fit snugly inside the ends of the air conduits 6, 8, 10 and 12, as will be explained in greater detail below.

Internal slide 688 is engaged in slide housing bore 692 so that it can move axially within the slide housing bore. Slide 688 is generally tubular in construction having a wall 689 and internal bore 720. There is a series of linearly aligned, spaced apart openings or ports 722, 724, 726 and 728 that open into bore 720. O" ring seals 730, 732, 734, 736, 738, 740, 742, 744 and 746 are position on each side of the respective ports to make a fluid or airtight seal around the ports and create discrete air chambers C-1, C-2, C-3 and C-4. Air in the chamber can flow around the circumference of the slide and enter the associated port. The slide 688 is plugged at each end with plugs 748 and 750. There is a flat washer 751 between the threaded plug and the end of the slide to facilitate sealing the end of the slide with the plugs. Plugs 748 and 750 provide structure for the user to grasp or touch to manipulate the slide and operate as stops when the slide is moved axially within the casing bore. The air chambers around openings 722, 724, 726 and 728 are placed into and out of alignment with the nipple connectors 700, 698, 696 and 694, respectively, when the nipple connectors are attached to the air conduits, to open and close the valve and to allow air flow or block air flow among the cushion A inflation zones, as explained with reference to other exemplary embodiments above.

It will be appreciated that, although in the illustrated embodiments, for purposes of clarity, the slide ports are aligned, and in registry with, the openings to the air conduits, it is not necessary that the two sets of openings be in perfect alignment. For the slide to function in an open position, for example, all that is necessary is for the air chambers C-1, C-2, C-3 and C-4 to be in alignment with the openings. As explained above, the air can flow around the slide within the air chamber and enter or exit through the port. This allows the slide valve to function even if the user inadvertently rotates the slide around its longitudinal axis, taking the two sets of openings out of registry. Thus, when reference is made to the slide ports and the openings to the air conduits being in alignment or registry, this generally is defined as the air chambers around the slide ports being appropriately positioned with regard to the openings to the air conduits so as to allow fluid communication through the slide ports and the air conduits. Hence, it is not necessary that the two sets of openings be in perfect alignment or registry, but only requires functional alignment, that is, an alignment that allows the fluid flow function between the conduit opening and the associated slide port.

The outer casing, slide housing and slide can be cylindrical, ovoid, triangular, rectangular or any other shape in cross-section as long the slide can be manipulated from side-to-side to move the respective openings into and out of functional alignment.

Figure 30:
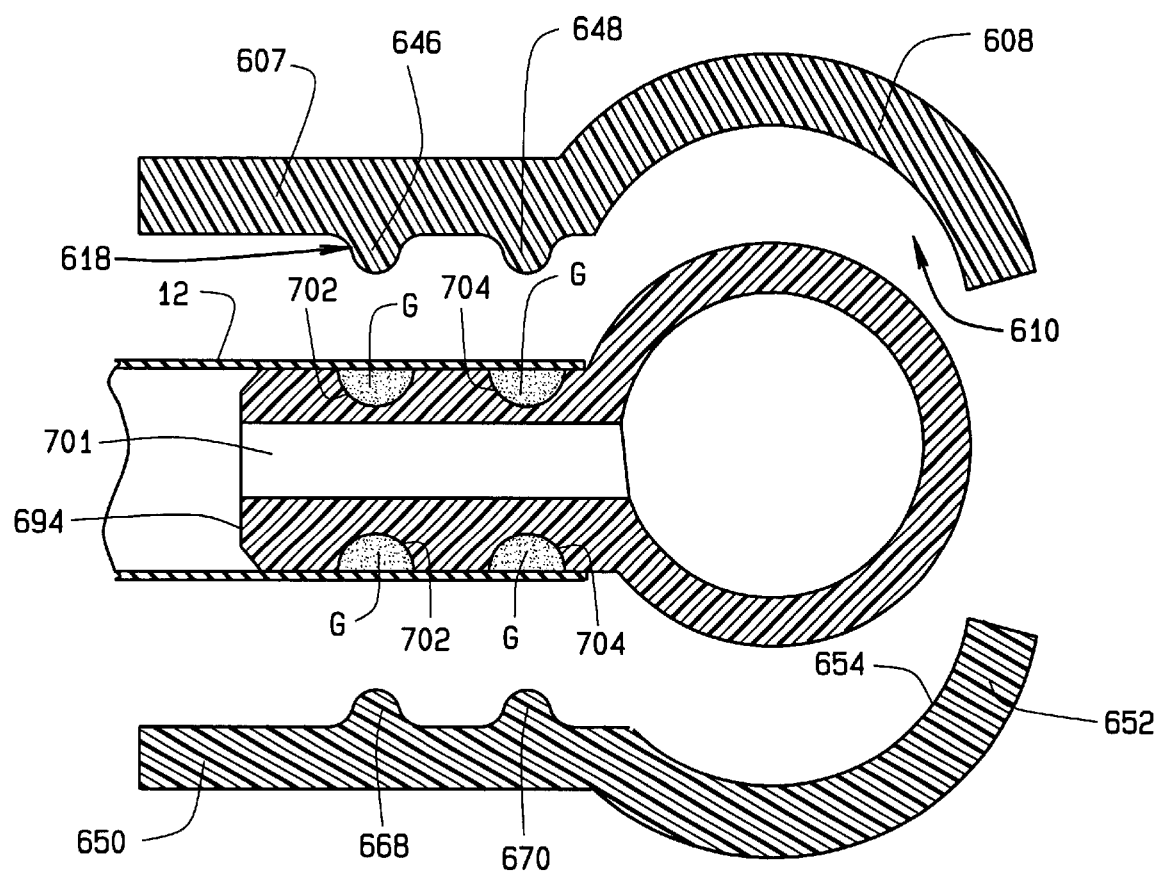
FIG. 30 is an enlarged, partial cross-sectional view of the disassembled valve taken through the center of a connector nipple and connector seat, the connector nipple inserted in the air conduit and connector seat, prior to assembly of the casing.
Figure 31:
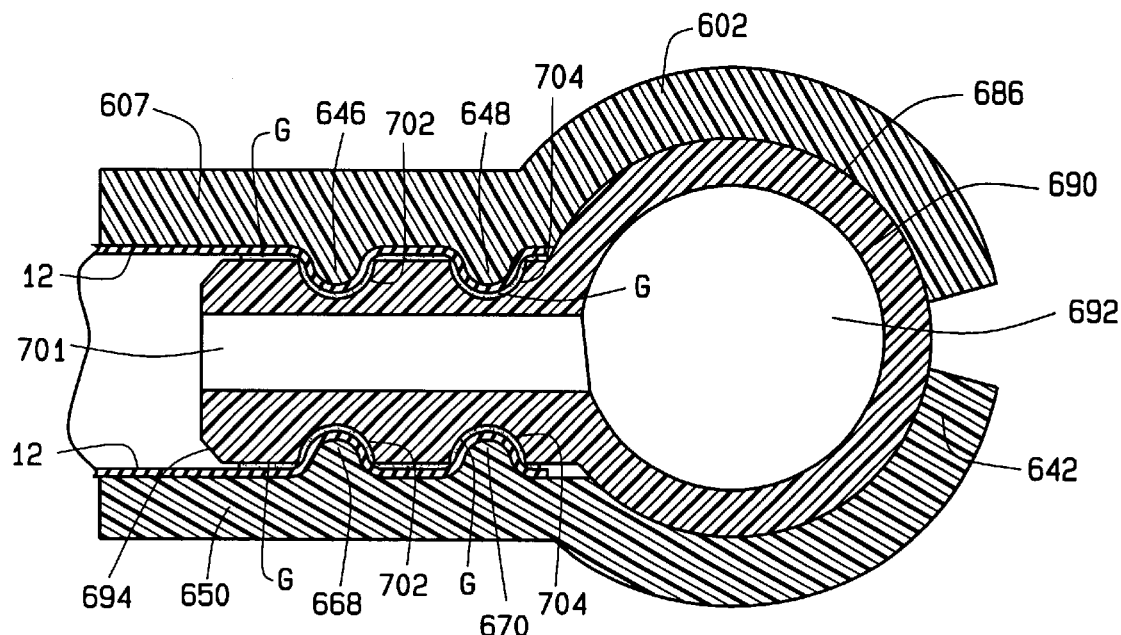
FIG. 31 is an enlarged, partial cross-sectional view of the assembled valve taken through the center of a connector nipple and connector seat, the connector nipple inserted in the air conduit and connector seat.

The structure of valve 600 provides for enhanced attachment to cushion A, as will now be explained. Referring to FIGS. 23, 30 and 31, it will be understood that one each of the nipple connectors is introduced into the open end of one of the air conduits. In the embodiment shown, each conduit has a generally D-shaped cross section, raised on the top side and flat on the base side. By way of example, referring to FIGS. 30 and 31, nipple connector 694 is inserted into the end of air conduit 12. Once the connector nipples are positioned in an air conduit, the two halves 606, 608 of the valve casing are positioned on each side of the slide housing 686 in a clamshell arrangement with the slide housing body 690 seated in cavity 686. The relatively flat forward sections of the casing halves, 607 and 650 overlap peripheral edge E of the cushion. The two halves then are tightly fastened together with rivets R, or other appropriate fasteners such as screws or the like, through the opposed and aligned mounting holes 672, 674, 676, 682, 684 and 620, 622, 624, 630 and 632 and through holes punched in the peripheral edge of the cushion A. As illustrated, peripheral edge E and air conduit 12 are impinged between the casing halves, in particular, pinching the material between the retainer grooves 702, 704 and the opposed detents 646, 648 and 668, 670. This impinging arrangement exists along the length of the valve, including each air conduit, thereby tightly clamping the valve to the periphery of the cushion A to prevent the valve from pulling out of the cushion.

Furthermore, as shown in FIG. 30, prior to insertion of a nipple connector into the conduit, adhesive or glue G can be introduced into the retainer grooves, as illustrated, grooves 702 and 704. Because a dollop of the adhesive is applied in the grooves, when the nipple connector is inserted into the open end of the conduit, the glue G generally stays in place in the grooves and is not mechanically pushed toward the body of the slide housing by the conduit wall, as can happen if adhesive is applied to a connector nipple having a smooth surface. When the two halves of the valve are tightened together, the detents engage the retainer grooves and force the adhesive out of the retainer grooves, causing it to flow onto the surfaces along the length of the nipple connector and the air conduit, as shown in FIG. 30, to provide for a better bond between the nipple connector and the air conduit. This process, of course, is duplicated with each nipple connector and air conduit. Consequently, the valve of the present invention provides for an enhanced mechanical attachment and adhesive attachment to the cushion.

Although valve 600 as illustrated provides for two retainer grooves on each connector nipple and, correspondingly, two retainer detents on the inside surfaces of both the first casing section and second casing section, it will be understood that various aspects of the invention can be accomplished if the nipple connector had one or more than two retainer grooves. Correspondingly, the casing halves can have one retainer detent or more that two. It is within the scope of the invention if the nipple connector has more retainer grooves than the casing sections have detents. Valve 600 can be constructed with more than four connector nipples or fewer than four connector nipples if there are more or less air conduits on the inflatable cushion.

As explained above with reference to other exemplary embodiments, an inflation apparatus also could be attached to valve 600 to allow inflation of all four zones of the cushion as described in detail above. As with the other embodiments, valve 600 can have an appropriate detent structure associated with the slide or the slide housing to secure the slide in place.

While cushion A and the novel valve are designed for seat cushions, they may be expanded in use and, as previously discussed, configured differently in the arrangement of the zones or the number of zones. Further, the same inventive principles can be applied to inflatable mattress, auto, truck, bicycle or motorcycle seat cushions or any other type of air cushioned seating or resting surface. Consequently, the term "cushion" as used in the appended claims is intended to include any such seating apparatus, regardless of configuration or application. Moreover, the novel valve may be employed in any air inflated device, other than cushions, which is divided in to air chambers or zones.

The foregoing description and the accompanying drawings are intended to be illustrative of the best mode of working the invention presently known to the inventors and should not be construed in a limiting sense.

What is claimed:

1. A valve assembly for use with an inflatable apparatus having a base and an array of upstanding fluid filled cells on one side of the base, the array of cells being divided into a plurality of inflation zones, each zone having a separate air conduit extending from the zone comprising:
   an outer casing comprising opposed sections attachable to the inflatable apparatus, said opposed sections defining a slide housing seat;
   a slide housing within the slide housing seat, the slide housing having a longitudinal bore and comprising at least one connector having an inner bore for fluid communication between an air conduit and the slide housing longitudinal bore; and
   a slide within said slide housing bore, said slide comprising a wall defining a longitudinal bore and at least one opening through the slide wall into said slide bore, wherein movement of the slide within the casing bore to a first position places the at least one slide opening in functional alignment with the at least one connector thereby opening the valve, and movement of the slide within the casing bore to a second position places the at least one slide opening out of functional alignment with the at least one connector thereby closing the valve.

2. The valve of claim 1 wherein said at least one connector has at least one retainer groove formed therein.

3. The valve of claim 2 wherein said outer casing has at least one detent positioned to engage said at least one connector retainer groove when the outer casing is attached to the apparatus.

4. The valve of claim 3 wherein a first casing section further comprises at least one retainer detent positioned to engage the at least one retainer groove in the connector when the outer casing is attached to the apparatus.

5. The valve of claim 3 wherein a second casing section further comprises at least one retainer detent positioned to engage the at least one retainer groove in the connector when the outer casing is attached to the apparatus.

6. The valve of claim 3 wherein a first casing section further comprises at least one connector seat having a detent therein positioned to engage the at least one retainer groove when the casing is attached to the apparatus.

7. The valve of claim 1 wherein said slide housing further comprises a plurality of connectors for fluid connection between the air conduits and the slide housing bore, said slide wall having a plurality of openings therein, wherein movement of the slide within the slide housing bore to a first position places each of the plurality of slide openings in functional alignment with one of the plurality of connectors thereby opening the valve, and the movement of the slide within the slide housing bore to a second position places the slide openings out of functional alignment with the connectors thereby closing the valve.

8. The valve of claim 7 wherein said outer casing further comprises a plurality of connector seats, said connector seats being perpendicular to said slide housing seat.

9. The valve of claim 7 wherein each of said plurality of connectors has a substantially semi-circular cross section.

10. The valve of claim 7 wherein each of the plurality of connectors has at least one retainer groove formed thereon and the casing further comprises a first section having a plurality of connector seats therein, each connector seat including at least one detent positioned to engage a connector retainer groove, and an opposed second section having a plurality of detents, one each of last said detents positioned to engage a connector retainer groove when the casing is attached to the apparatus base.

11. The valve of claim 1 wherein said outer casing further comprising means for attaching said outer casing to the apparatus.

12. A valve assembly for use with an inflatable apparatus having a plurality of individual inflation zones comprising:
   a casing having a first section and a second section when assembled together forming a longitudinal inner bore therebetween and a plurality of spaced apart openings through the casing into said bore for fluid communication between casing bore the plurality of cushion inflation zones; and
   a slide within said casing bore having a longitudinal inner bore and a plurality of spaced apart ports into the slide bore and comprising seals adjacent each of the plurality of ports to define an air chamber at the port, wherein movement of the slide within the casing bore to a first position places the air chambers in alignment with the casing openings thereby opening the valve, and the movement of the slide within the casing bore to a second position places the air chambers out of alignment with the casing openings thereby closing the valve.

13. In a cushion having a base and an array of upstanding fluid filled cells on one side, said array of cells being divided into a plurality of inflation zones, each zone having a separate air conduit extending from the zone, a valve assembly attached to the separate air conduits for putting the generally isolated zones into and out of fluid connection, the valve assembly comprising:
   a slide housing having a longitudinal bore therein and comprising a plurality of connectors, each of said plurality of connectors having a bore in fluid communication with the slide housing bore, each connector being in fluid communication with one each of the separate air conduits extending from an inflation zone, each of said connectors having at least one retainer groove formed in the surface thereof;
   an outer casing having a first section on a first side of the slide housing and second section on an opposite side of the slide housing, said first casing section having a plurality of connector seats for seating said plurality of connectors, each said connector seat having at least one detent for engaging a connector retainer groove when said slide housing is positioned between said casing sections; and
   a slide within said slide housing bore, said slide having an internal bore and a plurality of spaced apart ports in fluid communication with said last slide bore, wherein movement of the slide within the slide housing bore to a first position places the plurality of ports in functional alignment with the plurality of said slide housing connectors thereby opening the valve and placing the inflation zones in communication, and the movement of the slide within the slide housing bore to a second position places the plurality of ports out of functional alignment with the plurality of slide housing connectors thereby closing the valve and isolating the inflation zones.

14. The valve assembly of claim 13 wherein said second outer casing section has at least one detent formed thereon for engaging said retainer groove when said slide housing is positioned between said casing sections.

15. The valve assembly of claim 13 wherein said slide further comprises a plurality of seals with one seal on each side of a port, said seals defining discrete air compartments at the ports between the seals.

16. A cellular cushion comprising a flexible base having a peripheral edge;

a plurality of flexible hollow air containing cells fixed to and projecting upwardly from the base, the cells being separated into independent pneumatic zones;

an air conduit operatively connected to each of said independent pneumatic zones; and a valve for controlling air flow among said independent pneumatic zones, said valve comprising:
- a slide housing having a longitudinal bore therein and a plurality of connectors in fluid connection with the slide housing bore, one each of said connectors operatively associated with one each of said air conduits, each said connector having at least one retainer groove formed therein;
- an outer casing defining a longitudinal seat for the slide housing, said casing including a plurality of connector seats, each said connector seat having at least one detent for engaging a retainer groove when the slide housing and connectors are seated in said casing; and
- a slide within said slide housing bore, said slide having a longitudinal inner bore and ports along the length of the slide in fluid communication with said slide bore, one each of said ports being in functional alignment with one each of said connectors when said slide is in a first position within said slide housing bore, thereby allowing air flow among said pneumatic zones through said slide bore and said ports being out of functional alignment with said connectors when said slide is in a second position within said slide housing bore thereby blocking air flow among said pneumatic zones through said slide bore.

17. The cushion of claim 16 wherein said outer casing further comprises a first half and a second half, said casing halves impinging the cushion base peripheral edge and the air conduits between the casing halves when said valve is attached to the cushion.

18. A method of attaching a valve to a cellular cushion comprising a flexible base having a peripheral edge, a plurality of flexible hollow air cells fixed to and projecting upwardly from the base, the cells being separated into independent pneumatic zones, and an air conduit operatively connected to each of said independent pneumatic zones and terminating adjacent the peripheral edge, comprising;

introducing an adhesive into retainer grooves formed in an external surface of each of a plurality of conduit connectors on a valve slide housing;

aligning one each of the connectors with an open end of one each of the cushion air conduits;

inserting said connectors into the air conduits;

positioning a first valve casing section on the peripheral edge of the cushion at a first side of the slide housing, said first valve casing section having a plurality of detents formed on an inner surface, one each of the detents positioned to align with a connector retainer groove;

positioning a second valve casing section on the peripheral edge of the cushion at an opposite side of the slide housing, said second valve section having a plurality of detents formed on an inner surface, one each of the last said detents positioned to align a connector retainer groove; and securing the first valve casing section to the second valve casing section to impinge the peripheral edge of the cushion and the air conduits between the retainer grooves and the detents on the first and second valve casing sections and displace adhesive from the retainer grooves to form adhesive seals between the air conduits and the connectors.

* * * * *